United States Patent
Natsumeda et al.

(10) Patent No.: US 10,249,934 B2
(45) Date of Patent: Apr. 2, 2019

(54) WIRELESSLY-COMMUNICABLE MEMORY CARD

(71) Applicant: TOSHIBA MEMORY CORPORATION, Tokyo (JP)

(72) Inventors: Tsubasa Natsumeda, Yokohama Kanagawa (JP); Michio Ido, Yokohama Kanagawa (JP); Keisuke Sato, Yokohama Kanagawa (JP); Shigeto Endo, Kamakura Kanagawa (JP); Taku Nishiyama, Yokohama Kanagawa (JP); Katsuyoshi Watanabe, Fujisawa Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 231 days.

(21) Appl. No.: 15/253,882

(22) Filed: Sep. 1, 2016

(65) Prior Publication Data

US 2017/0155184 A1    Jun. 1, 2017

(30) Foreign Application Priority Data

Nov. 30, 2015   (JP) ................................. 2015-233522
May 19, 2016    (JP) ................................. 2016-100705

(51) Int. Cl.
*H01Q 1/22*      (2006.01)
*H04B 5/00*      (2006.01)
*H01Q 1/48*      (2006.01)

(52) U.S. Cl.
CPC ......... *H01Q 1/2275* (2013.01); *H01Q 1/2291* (2013.01); *H01Q 1/48* (2013.01); *H04B 5/0031* (2013.01); *H04B 5/0037* (2013.01)

(58) Field of Classification Search
CPC ... H01Q 1/2275; H01Q 1/2291; H04B 5/0037
See application file for complete search history.

(56) References Cited

U.S. PATENT DOCUMENTS

| | | | |
|---|---|---|---|
| 7,395,975 | B2 | 7/2008 | Ito |
| 2009/0051606 | A1 | 2/2009 | Ochi et al. |
| 2015/0254547 | A1 | 9/2015 | Sato |

FOREIGN PATENT DOCUMENTS

| | | |
|---|---|---|
| JP | 4656235 B2 | 3/2011 |
| JP | 2015001797 A | 1/2015 |
| JP | 2015-170355 A | 9/2015 |

*Primary Examiner* — Graham Smith
(74) *Attorney, Agent, or Firm* — Kim & Stewart LLP

(57) ABSTRACT

A memory card includes a substrate, a nonvolatile memory on the substrate, a memory controller on the substrate and configured to control access to the nonvolatile memory, an interface terminal for external wired connection, on the substrate, an antenna, a plain region surrounded by the antenna including a first region that overlaps with the substrate and a second region that does not overlap with the substrate, and a communication controller disposed on the substrate, electrically connected to the antenna, and configured to wirelessly communicate with an external device through the antenna, using power generated at the antenna by an electromagnetic induction caused by the external device.

20 Claims, 20 Drawing Sheets

WIRELESSLY-COMMUNICABLE MEMORY CARD

CROSS-REFERENCE TO RELATED APPLICATION

This application is based upon and claims the benefit of priority from Japanese Patent Application No. 2015-233522, filed Nov. 30, 2015 and Japanese Patent Application No. 2016-100705, filed May 19, 2016; the entire contents of both applications are incorporated herein by reference.

FIELD

Embodiments described herein relate generally to a semiconductor memory device, in particular, a wirelessly-communicable memory card.

BACKGROUND

Antennas for communication with external devices may be mounted in various devices. For example, an antenna such as a dipole antenna, a loop antenna, or a dielectric antenna is mounted in a device.

DETAILED DESCRIPTION

Generally, mounting an antenna in a device may increase the manufacturing cost of the device.

An embodiment provides a semiconductor memory device and an adapter including a wireless antenna, that can be manufactured at a lower manufacturing cost, while maintaining sufficient communication ability.

In general, according to an embodiment, a memory card includes a substrate, a nonvolatile memory on the substrate, a memory controller on the substrate and configured to control access to the nonvolatile memory, an interface terminal for external wired connection, on the substrate, an antenna, a plain region surrounded by the antenna including a first region that overlaps with the substrate and a second region that does not overlap with the substrate, and a communication controller disposed on the substrate, electrically connected to the antenna, and configured to wirelessly communicate with an external device through the antenna, using power generated at the antenna by an electromagnetic induction caused by the external device.

Hereinafter, a semiconductor memory device and an adapter according to embodiments will be described in detail with reference to the appended drawings. These embodiments do not limit the present disclosure.

An element according to embodiments and the description thereof may be represented in a plurality of manners in the following description. The element and the description thereof may also be represented in other unrepresented manners. Furthermore, an element and the description thereof that are not represented in a plurality of manners may also be represented in other manners.

First Embodiment

Figure 1:
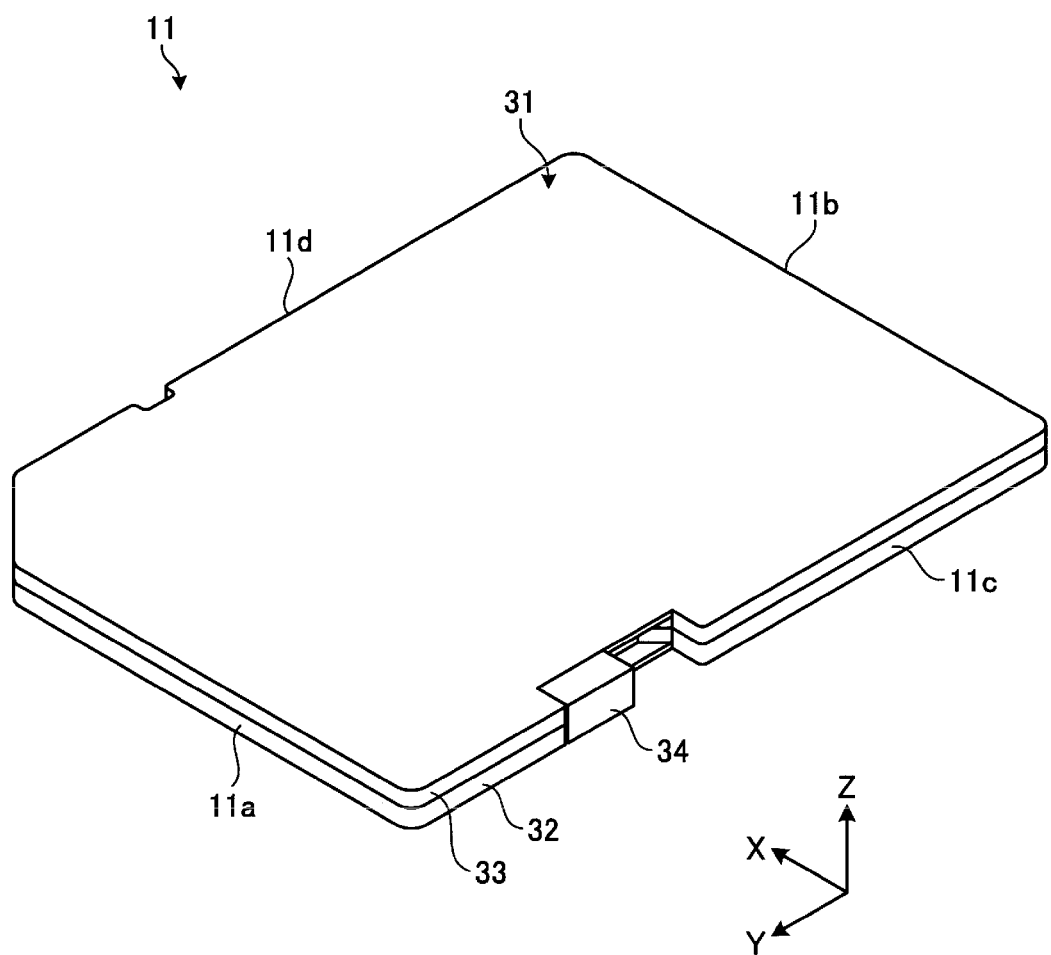
FIG. 1 is a perspective view of an SD card according to a first embodiment.

Hereinafter, a first embodiment will be described with reference to FIG. 1 to FIG. 4. FIG. 1 is a perspective view of an SD card 11 according to the first embodiment. The SD card 11 is one example of a semiconductor memory device. The semiconductor memory device may be another device such as a MultiMediaCard or a USB flash memory. The semiconductor memory device is a device or a system having a semiconductor chip and may be a wireless communication device such as a mobile phone.

An X axis, a Y axis, and a Z axis are defined in the present disclosure as illustrated in each drawing. The X axis, the Y axis, and the Z axis are orthogonal to one another. The X axis is defined along a width direction of the SD card 11. The Y axis is defined along a length direction of the SD card 11. The Z axis is defined along a thickness direction of the SD card 11.

A wireless communication technology is applicable to the SD card 11 of the present embodiment. For example, near field communication (NFC) that uses a frequency of 13.56 MHz is applicable to the SD card 11. Other wireless communication technologies may be applied to the SD card 11.

The SD card 11 that employs NFC generates an induction current with a wireless antenna by the electromagnetic induction. Thus, as described below, the SD card 11 includes a wireless antenna formed in a shape that may be referred to as, for example, a coil shape, a spiral shape, or a swirling shape.

Figure 2:
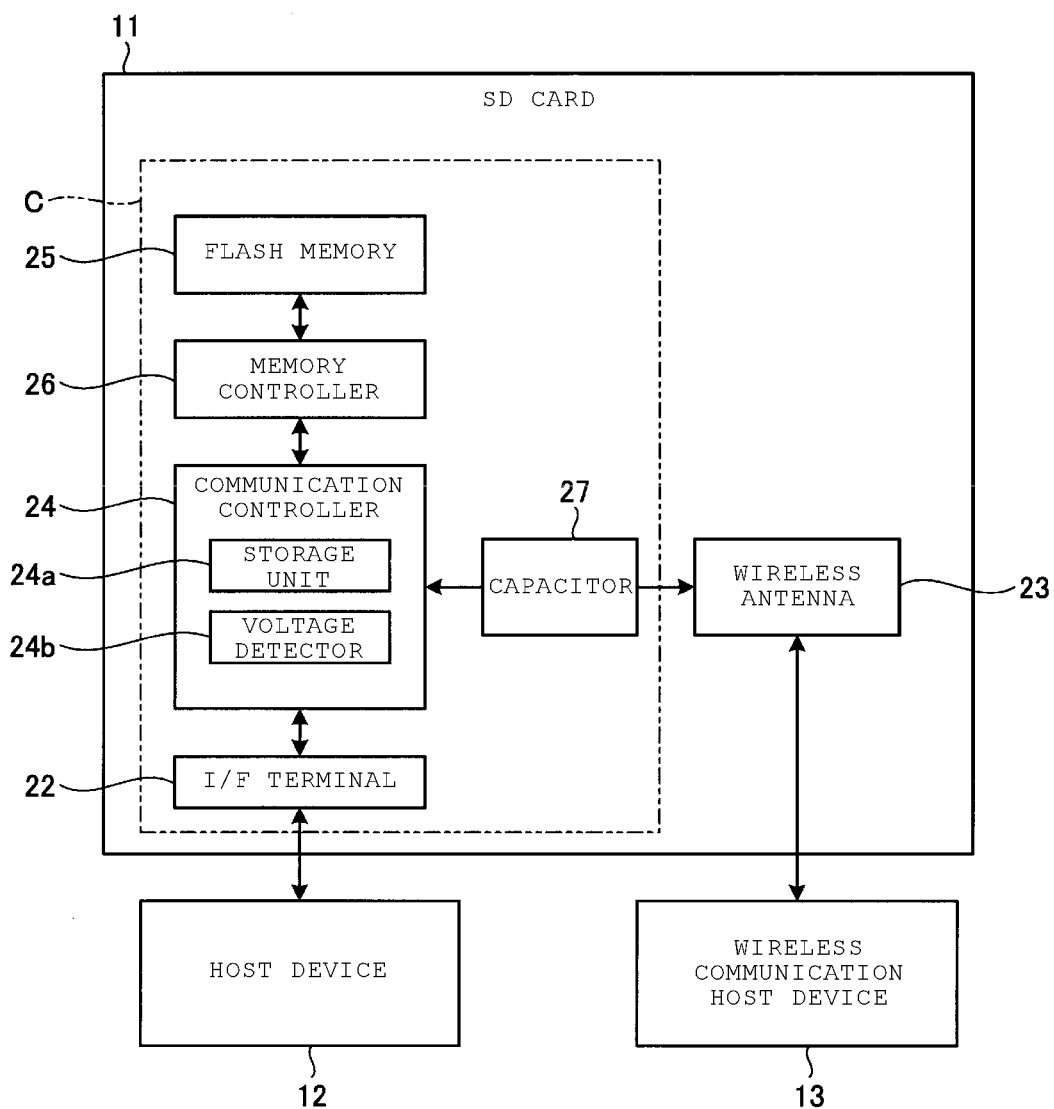
FIG. 2 is a block diagram of a system that includes the SD card according to the first embodiment.

FIG. 2 is a block diagram of a system that includes the SD card 11 according to the first embodiment. As illustrated in FIG. 2, the SD card 11 is electrically (and physically) connected to a host device 12. Furthermore, the SD card 11 wirelessly communicates with a wireless communication host device 13. The host device 12 is one example of a first external device. The wireless communication host device 13 is one example of a second external device. Each of the host device 12 and the wireless communication host device 13 is, for example, a personal computer, a portable computer, a smartphone, a mobile phone, a server, a smart card, or another device.

The SD card 11 includes an interface (I/F) terminal 22, a wireless antenna 23, a communication controller 24, a flash memory 25, a memory controller 26, and a capacitor 27. The I/F terminal 22 is one example of a first interface terminal. The flash memory 25 is one example of a nonvolatile memory.

The communication controller 24 controls communication between the SD card 11 and the host device 12 and communication between the SD card 11 and the wireless communication host device 13. The communication controller 24 includes a storage unit 24a and a voltage detector 24b. The storage unit 24a may be an electronic component that is independent of the communication controller 24. In that case, the communication controller 24 is connected to the storage unit 24a.

The communication controller 24 and the memory controller 26 maybe included in one electronic component. In addition, a plurality of electronic components, wiring, and a program may configure the communication controller 24 and the memory controller 26. That is, each of the communication controller 24 and the memory controller 26 may include one electric element, a plurality of electric elements, or one or more electric elements and programs.

When the SD card 11 is electrically (and physically) connected to the host device 12, the SD card 11 is operated by power supplied from the host device 12. For example, the host device 12 writes data into the SD card 11 or reads data from the SD card 11.

The SD card 11 can send data to and receive data from the wireless communication host device 13 in a state where the SD card 11 is not physically connected to an external device such as the host device 12 and the wireless communication host device 13 and power is not supplied from the external device. For example, the SD card 11 can send data to and receive data from the wireless communication host device 13 using power generated (induced) by the electromagnetic induction caused at the wireless antenna 23. The SD card 11, for example, performs NFC communication at a frequency of approximately 13.56 MHz and sends data to and receives data from the wireless communication host device 13. That is, the SD card 11 can be operated without supply of power from the host device 12.

The SD card 11 according to the present embodiment sends data to and receives data from the host device 12 in accordance with an SD interface. The SD card 11 may send data to and receive data from the host device 12 using the other interfaces. The SD card 11 sends data to and receives data from the wireless communication host device 13 in accordance with an NFC interface. The SD card 11 may send data to and receive data from the wireless communication host device 13 using the other wireless communication interfaces. The host device 12 and the wireless communication host device 13 may be the same device.

As illustrated in FIG. 1, the SD card 11 further includes a casing 31. The casing 31 is formed of, for example, synthetic resin that has non-magnetic and insulating properties. The casing 31 may be formed of the other materials.

The casing 31 is formed in an approximately quadrangular box shape. The casing 31 may be formed in the other shapes. The casing 31 includes a bottom cover 32, a top cover 33, and a lock switch 34. The bottom cover 32 is one example of a first cover. The top cover 33 is one example of a second cover.

Figure 3:
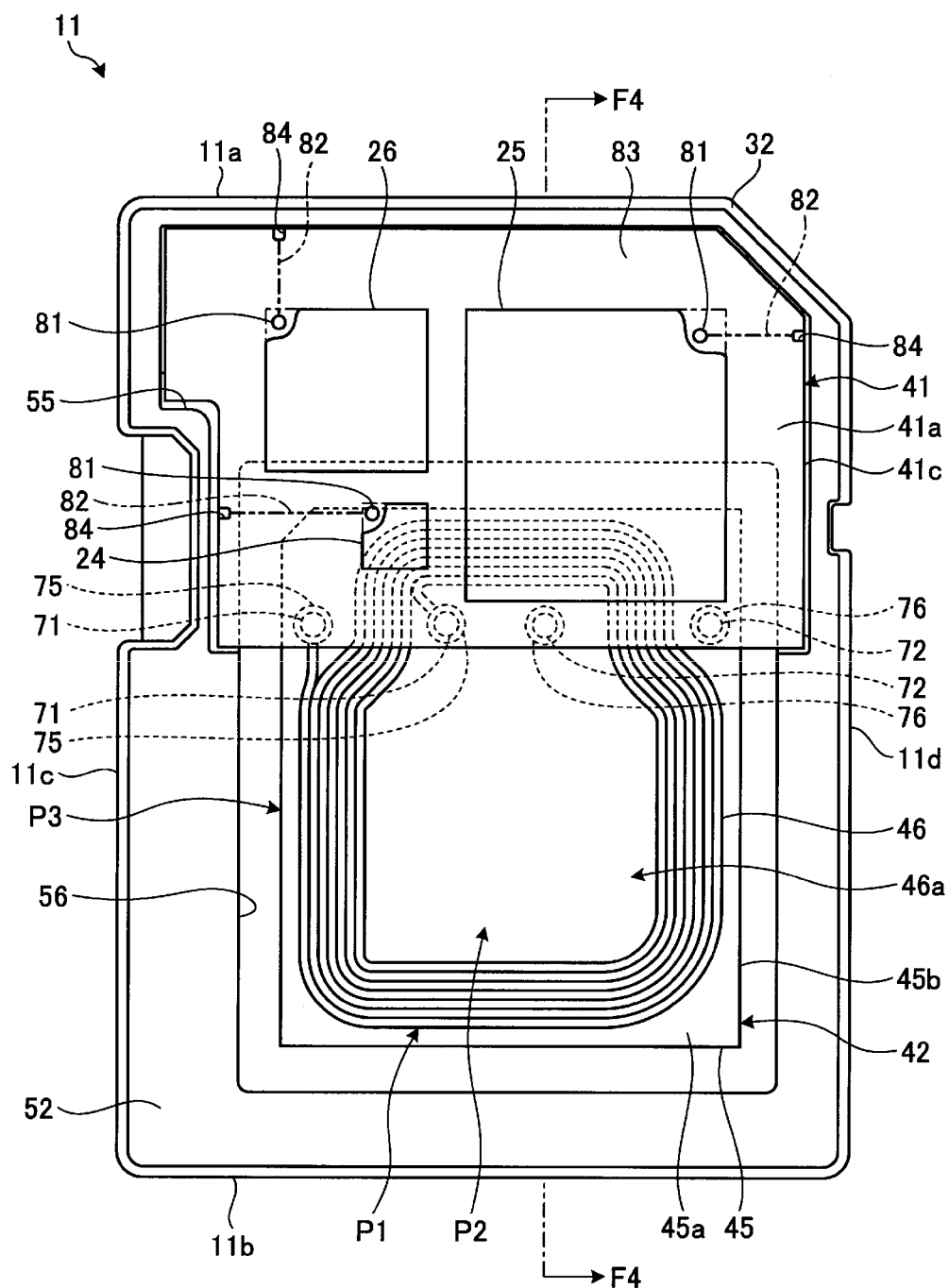
FIG. 3 is a plan view of the SD card according to the first embodiment, from which a top cover is removed.

FIG. 3 is a plan view of an internal structure of the SD card 11 according to the first embodiment, from which the top cover 33 is removed. Further, a part of each of the communication controller 24, the flash memory 25, and the memory controller 26 is omitted in FIG. 3. FIG. 3 illustrates contour lines of the omitted parts of the communication controller 24, the flash memory 25, and the memory controller 26 with double-dot chain lines.

As illustrated in FIG. 3, the SD card 11 further includes a first substrate 41 and an antenna module 42. The casing 31 accommodates the first substrate 41, the antenna module 42, the communication controller 24, the flash memory 25, and the memory controller 26.

The communication controller 24, the flash memory 25, and the memory controller 26 are mounted on the first substrate 41. The antenna module 42 includes a second substrate 45 and a first antenna pattern 46. The wireless antenna 23 in FIG. 2 includes the first antenna pattern 46 in the first embodiment. The first antenna pattern 46 is one example of a first antenna.

The SD card 11 is formed in an approximately quadrangular card shape and includes four sides 11a, 11b, 11c, and 11d. For convenience of description, the four sides 11a to 11d of the SD card 11 will be respectively referred to as a front side 11a, a rear side 11b, a left side 11c, and a right side 11d. This naming of the front side 11a, the rear side 11b, the left end portion 11c, and the right side 11d is based on the position in FIG. 3 and does not limit the directions and other features of each of the sides 11a, 11b, 11c, and 11d.

The front side 11a is one side of the SD card 11 in the direction along the Y axis. The rear side 11b is the other side of the SD card 11 in the direction along the Y axis and opposite to the front side 11a. The front side 11a and the rear side 11b extend in the direction along the X axis.

The left side 11c is one end portion of the SD card 11 in the direction along the X axis. The right side 11d is the other end portion of the SD card 11 in the direction along the X axis and is positioned on the opposite side from the left side 11c. Each of the left side 11c and the right side 11d extends in the direction along the Y axis.

Figure 4:
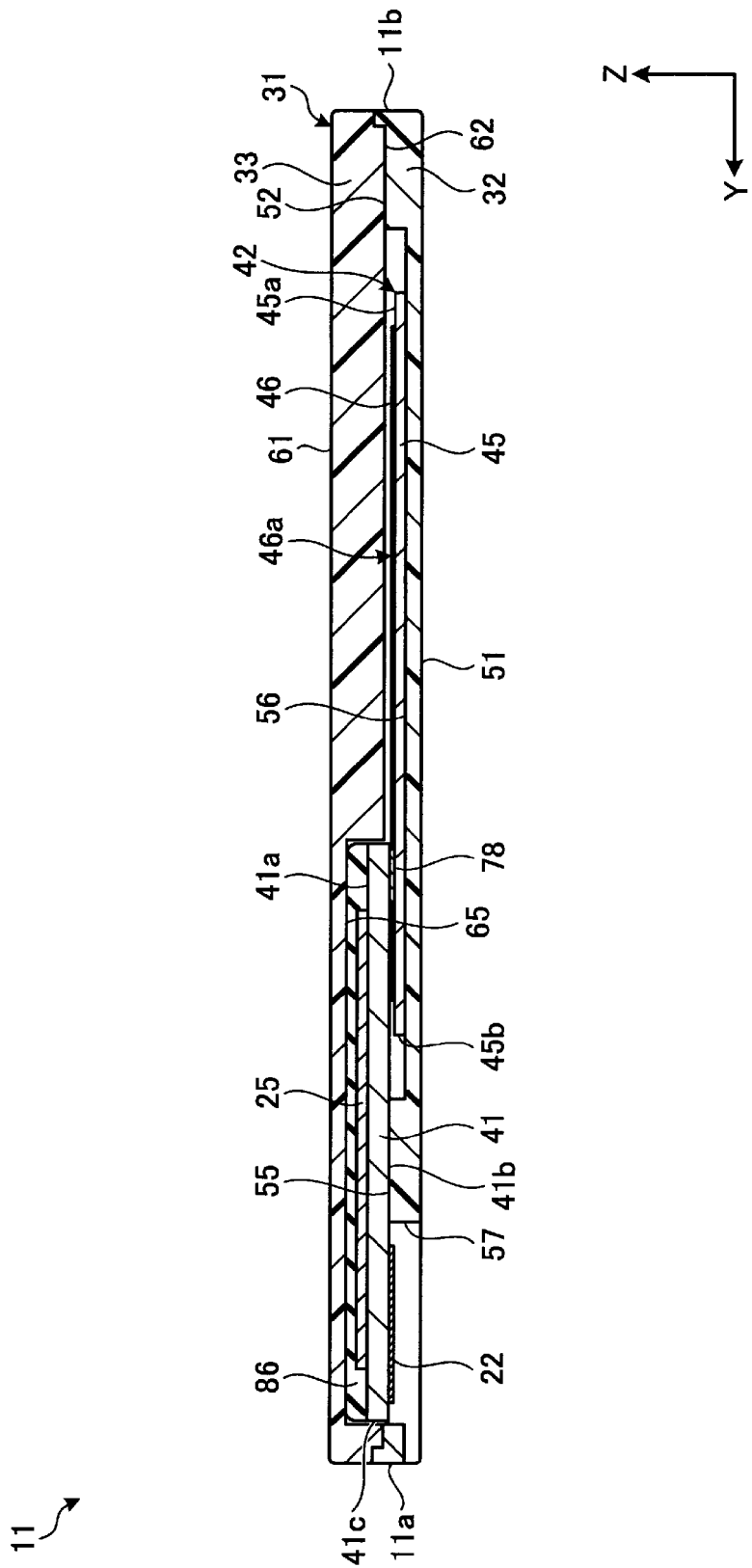
FIG. 4 is a cross-sectional view of the SD card according to the first embodiment taken along a line F4-F4 in FIG. 3.

FIG. 4 is a cross-sectional view of the SD card 11 according to the first embodiment taken along a line F4-F4 in FIG. 3. As illustrated in FIG. 4, the bottom cover 32 includes a bottom surface 51 and a first inner surface 52. The bottom surface 51 forms one surface of the casing 31 that is exposed to the outside. The first inner surface 52 is positioned opposite to the bottom surface 51.

A first recess portion 55, a second recess portion 56, and a plurality of terminal holes 57 are provided in the bottom cover 32. FIG. 4 illustrates one of the plurality of terminal holes 57. Each of the first recess portion 55 and the second recess portion 56 maybe referred to as, for example, a recess, an accommodation region, or a fit portion. The first recess portion 55 and the second recess portion 56 are provided on the first inner surface 52. In other words, the first and second recess portions 55 and 56 are regions recessed from the first inner surface 52.

The first recess portion 55 and the second recess portion 56 are arranged to partially overlie each other in the direction along the Y direction. The first recess portion 55 is closer to the front side 11a than the second recess portion 56. More specifically, an end portion of the first recess portion 55 in the positive direction along the Y axis (the direction to which the Y-axis arrow is directed) is closer to the front side 11a than an end portion of the second recess portion 56 in the positive direction along the Y axis.

The first recess portion 55 accommodates the first substrate 41. A part of the first substrate 41 is positioned outside of the first recess portion 55 in the thickness direction of the first substrate 41 (in the direction along the Z axis). In other words, the depth of the first recess portion 55 is smaller than the thickness of the first substrate 41. The depth of the first recess portion 55 may be greater than the thickness of the first substrate 41. The second recess portion 56 accommodates the antenna module 42. A part of the antenna module 42 may be positioned outside the second recess portion 56.

The plurality of terminal holes 57 is provided in the first recess portion 55. The plurality of terminal holes 57 is adjacent to the front side 11a and is lined up in the direction along the X axis. The plurality of terminal holes 57 passes through the bottom cover 32 between the bottom surface 51 and the first inner surface 52. In other words, the plurality of terminal holes 57 is opened in the first recess portion 55.

The top cover 33 is coupled with the bottom cover 32. The top cover 33 covers the first substrate 41 accommodated in the first recess portion 55 and the antenna module 42 accommodated in the second recess portion 56.

The top cover 33 includes an upper surface 61 and a second inner surface 62. The upper surface 61 forms one surface of the casing 31 that is exposed to the outside. In terms of the casing 31, the upper surface 61 is positioned opposite to the bottom surface 51. In terms of the top cover 33, the second inner surface 62 is positioned opposite to the upper surface 61.

A third recess portion 65 is formed in the top cover 33. The third recess portion 65 is formed on the second inner surface 62. Coupling of the top cover 33 with the bottom cover 32 causes the third recess portion 65 to accommodate the part of the first substrate 41 that is positioned outside the first recess portion 55. The first recess portion 55 and the third recess portion 65 hold the first substrate 41 and restrict movement of the first substrate 41.

The first substrate 41 is, for example, a printed circuit board (PCB). The first substrate 41 may be another substrate such as a flexible printed circuit board (FPC). The first substrate 41 includes a first surface 41a, a second surface 41b, and a side surface 41c.

The first surface 41a is formed to be approximately flat and faces the top cover 33. The second surface 41b is formed to be approximately flat and opposite to the first surface 41a. The second surface 41b faces the bottom cover 32. The end surface 41c connects an end of the first surface 41a and an end of the second surface 41b.

As illustrated in FIG. 3, the communication controller 24, the flash memory 25, and the memory controller 26 are mounted on the first surface 41a of the first substrate 41. At least one of the communication controller 24, the flash memory 25, and the memory controller 26 may be mounted on another surface of the first substrate 41. Furthermore, the communication controller 24 maybe disposed on another element such as the second substrate 45.

The first substrate 41 is formed in an approximately quadrangular board shape. The first substrate 41 maybe formed in another shape. The length of the first substrate 41 in the direction along the Y axis is smaller than half of the length of the casing 31 in the direction along the Y axis. The dimensions of the first substrate 41 are not limited thereto. For example, the length of the first substrate 41 in the direction along the Y axis maybe greater than half of the length of the casing 31 in the direction along the Y axis.

As illustrated in FIG. 4, a plurality of I/F terminals 22 is provided on the second surface 41b of the first substrate 41. FIG. 4 illustrates one of the plurality of I/F terminals 22. The plurality of I/F terminals 22 is adjacent to the front side 11a of the SD card 11 and is lined up in the direction along the X axis. The plurality of I/F terminals 22 is exposed to the outside of the casing 31 through the plurality of terminal holes 57 formed in the bottom cover 32.

The I/F terminal 22 according to the present embodiment is an SD interface terminal and used for electrical connection to the host device 12. In other words, the I/F terminal 22 can be electrically connected to the host device 12.

The second substrate 45 of the antenna module 42 is an FPC. Thus, the second substrate 45 is thinner and more flexible than the first substrate 41. The second substrate 45 may be another substrate such as a PCB.

The second substrate 45 includes a connection surface 45a. The connection surface 45a faces the top cover 33. Apart of the connection surface 45a of the second substrate 45 faces a part of the second surface 41b of the first substrate 41. That is, when the first surface 41a is viewed in a plan view as illustrated in FIG. 3, a part of the first substrate 41 overlies a part of the second substrate 45.

The second substrate 45 is formed in an approximately square shape. Thus, a greater number of second substrates 45 maybe obtained from one large substrate. The second substrate 45 may be formed in other shapes.

The length of the second substrate 45 in the direction along the Y axis is greater than the length of the first substrate 41 in the direction along the Y axis. The dimensions of the second substrate 45 are not limited thereto. For example, the length of the second substrate 45 in the direction along the Y axis maybe smaller than the length of the first substrate 41 in the direction along the Y axis. The length of the second substrate 45 in the direction along the X axis is smaller than the length of the first substrate 41 in the direction along the X axis. The dimensions of the second substrate 45 are not limited thereto. For example, the length of the second substrate 45 in the direction along the X axis may be greater than the length of the first substrate 41 in the direction along the X axis.

The first antenna pattern 46 is mounted on the second substrate 45. The first antenna pattern 46 according to the present embodiment is a wiring pattern that is formed on the second substrate 45. The first antenna pattern 46 maybe formed of another material such as an insulated copper wire. The first antenna pattern 46 of the wireless antenna 23 is a loop antenna that is formed in a coil shape. The first antenna pattern 46 is formed in an approximately quadrangular annular shape in the present embodiment. The first antenna pattern 46 may be formed in another shape such as a circular annular shape.

The first antenna pattern 46, which is a loop antenna, is formed by using a conductor (wiring pattern) that extends to surround an inside region of the first antenna pattern 46. Any conductor that surrounds the inside region of the first antenna pattern 46 may be used for the first antenna pattern 46, and the conductor may be wound less than once. In other words, the inside region of the first antenna pattern 46 may be connected with the outside region of the first antenna pattern 46. The conductor may be wound a plurality of times. Applying a voltage to the end portion of the conductor causes the first antenna pattern 46 to generate magnetic flux that passes through the inside of the first antenna pattern 46. In addition, the magnetic flux passing through the inside of the first antenna pattern 46 generates a voltage in the conductor. The first antenna pattern 46 communicates with an external device using the electromagnetic induction.

The second substrate 45 includes a first part P1, a second part P2, and a third part P3 (See FIG. 3). Each of the first to third parts P1 to P3 may be referred to as, for example, a region or an area.

The first part P1 is a part of the second substrate 45 in which the first antenna pattern 46 is mounted. More specifically, the first part P1 is a part of the second substrate 45 that overlies the first antenna pattern 46 when the connection surface 45a of the second substrate 45 is viewed as illustrated in FIG. 3.

The second part P2 is a part of the second substrate 45 that is surrounded by the first part P1. The third part P3 is a part of the second substrate 45 that surrounds the first part P1. In other words, the third part P3 is positioned between the first part P1 and side surfaces 45b of the second substrate 45. The first part P1 is positioned between the second part P2 and the third part P3.

As illustrated by broken lines in FIG. 3, two first pads 71 and two second pads 72 are formed on the second surface 41b of the first substrate 41. The two first pads 71 are one example of a plurality of first pads and may be referred to as, for example, a pattern, a land, a conductor, or a metal portion. Each of the two second pads 72 is one example of a second pad and may be referred to as, for example, a pattern, a land, a conductor, or a metal portion.

As illustrated in FIG. 2, a circuit C is disposed on the first substrate 41. The circuit C includes the I/F terminal 22, the communication controller 24, the flash memory 25, the memory controller 26, the two first pads 71 in FIG. 3. In addition, various wiring and electronic components are provided in the first substrate 41. That is, the circuit C is formed on the first substrate 41, and a current externally supplied or induced in the SD card 11 flows therein.

As described above, the two first pads 71 in FIG. 3 are included in the circuit C. Meanwhile, the two second pads 72 are electrically independent of the circuit C. That is, when a current flows in the circuit C, a current does not flow in the second pads 72. The second pads 72 may be connected to ground.

The first antenna pattern 46 of the antenna module 42 includes two third pads 75. Furthermore, the second substrate 45 includes two fourth pads 76. The third and fourth pads 75 and 76 are illustrated by broken lines in FIG. 3. The two third pads 75 are one example of a plurality of third pads and may be referred to as, for example, a pattern, a land, a conductor, or a metal portion. Each of the two fourth pads 76 is one example of a fourth pad and may be referred to as, for example, a pattern, a land, a conductor, or a metal portion.

The two third pads 75 are two terminals of the first antenna pattern 46. In other words, one third pad 75 is provided in one end portion of the first antenna pattern 46. The other third pad 75 is provided in the other end portion of the first antenna pattern 46.

The two fourth pads 76 are electrically independent of the first antenna pattern 46. For example, when a current flows in the first antenna pattern 46, a current does not flow in the fourth pads 76. The fourth pads 76 may be connected to ground.

One third pad 75 and one fourth pad 76 are provided in the second part P2 of the second substrate 45. The other third pad 75 and the other fourth pad 76 are provided in the third part P3 of the second substrate 45. At least one of the two third pads 75 and at least one of the two fourth pads 76 are provided in the second part P2, and at least one of the two third pads 75 and at least one of the two fourth pads 76 are provided in the third part P3. Alternatively, all of the two third pads 75 and the two fourth pads 76 may be provided in the second part P2 or the third part P3.

The third pads 75 and the fourth pads 76 are provided on the connection surface 45a of the second substrate 45. The two third pads 75 are soldered to the corresponding first pads 71 of the first substrate 41 using a solder 78 illustrated in FIG. 4. The two fourth pads 76 are soldered to the corresponding second pads 72 of the first substrate 41 using the solder 78.

Soldering the third pads 75 to the first pads 71 causes the first antenna pattern 46 to be electrically connected to the circuit C of the first substrate 41. The first antenna pattern 46 is electrically connected to, for example, the communication controller 24. Meanwhile, the second pads 72 and the fourth pads 76 that are soldered to each other are electrically independent of the circuit C and the first antenna pattern 46.

Soldering the third pads 75 to the first pads 71 and the fourth pads 76 to the second pads 72 causes the antenna module 42 to be attached to the first substrate 41. The third pads 75 are fixed to the corresponding first pads 71 using the solder 78. Furthermore, the fourth pads 76 are fixed to the corresponding second pads 72 using the solder 78.

Apart of the first antenna pattern 46 overlies the first substrate 41 when the first surface 41a of the first substrate 41 is viewed as illustrated in FIG. 3. Furthermore, a part of the first part P1, a part of the second part P2, and a part of the third part P3 of the second substrate 45 overlie the first substrate 41.

Furthermore, when the first surface 41a of the first substrate 41 is viewed as illustrated in FIG. 3, a part of an inside 46a of the first antenna pattern 46 is positioned outside of the first substrate 41. In other words, apart of the inside 46a of the first antenna pattern 46 does not overlie the first substrate 41. The inside 46a of the first antenna pattern 46 is a region surrounded by the annular first antenna pattern 46. The inside 46a maybe empty. In addition, a component may be disposed in the inside 46a. When the first surface 41a of the first substrate 41 is viewed as illustrated in FIG. 3, a part of the first antenna pattern 46 as well is positioned outside of the first substrate 41.

In other words, when the first surface 41a of the first substrate 41 is viewed as illustrated in FIG. 3, a part of the second part P2 of the second substrate 45 is positioned outside of the first substrate 41. When the first surface 41a is viewed as illustrated in FIG. 3, the inside 46a of the first antenna pattern 46 substantially matches the second part P2. The inside 46a of the first antenna pattern 46 may be different from the second part P2.

As illustrated in FIG. 4, a part of the inside 46a of the first antenna pattern 46 that is positioned outside of the first substrate 41 faces the bottom cover 32 and the top cover 33 in the direction along the Z axis. In other words, a part of the inside 46a of the first antenna pattern 46 that is positioned outside of the first substrate 41 overlies, in the direction along the Z axis, the bottom cover 32 and the top cover 33 that are formed by using resin.

As illustrated in FIG. 3, a plurality of connection pads 81 is provided on the first surface 41a of the first substrate 41. Each of the plurality of connection pads 81 is one example of a connection pad and may be referred to as, for example, a pattern, a land, a conductor, or a metal portion. Each of the plurality of connection pads 81 is electrically connected to the corresponding terminal of the communication controller 24, the flash memory 25, or the memory controller 26 by, for example, soldering. The connection pads 81 may be provided on the second surface 41b.

A first lead 82 extends from each of the plurality of connection pads 81. The first lead 82 is covered with, for example, a first solder resist 83 of the first substrate 41. The first solder resist 83 forms at least a part of the first surface 41a of the first substrate 41. FIG. 3 illustrates the first lead 82 with a double-dot chain line for description.

The first lead 82 extends from the corresponding connection pad 81 to the end surface 41c of the first substrate 41. In other words, the first lead 82 extends to the end of the first surface 41a of the first substrate 41. The first lead 82 may include a plurality of curved parts. The end portion of the first lead 82 is apart from the end of the first surface 41a.

A plurality of first openings 84 is provided in the first solder resist 83. The first opening 84 is, for example, a notch that extends from the end of the first surface 41a of the first substrate 41. The first opening 84 may be a hole.

When the first surface 41a of the first substrate 41 is viewed as illustrated in FIG. 3, the end portion of the first lead 82 substantially overlies the edge of the first solder resist 83 that forms the first opening 84. The end portion of the first lead 82 may be arranged in other positions. The first opening 84 is used when etchback is performed on the first lead 82.

As illustrated in FIG. 4, a seal resin 86 covers the first surface 41a of the first substrate 41, the communication controller 24, the flash memory 25, and the memory controller 26. The seal resin 86 is, for example, synthetic resin and closely adheres to the first surface 41a of the first substrate 41, the communication controller 24, the flash memory 25, and the memory controller 26. The seal resin 86 covers the first opening 84 of the first solder resist 83. FIG. 3 illustrates the first substrate 41 without the seal resin 86.

The wireless antenna 23 (first antenna pattern 46) in FIG. 2 generates a current or a voltage by the electromagnetic induction in the SD card 11 described above when the wireless antenna 23 receives an electromagnetic wave emitted from the wireless communication host device 13. The wireless antenna 23 supplies generated power to the communication controller 24.

The wireless antenna 23 according to the present embodiment is set to conform to a predetermined frequency or a frequency bandwidth corresponding to NFC. Since a part of the first antenna pattern 46 and a part of the inside 46a of the wireless antenna 23 overlie the first substrate 41 in the direction along the Z axis, the frequency or the frequency bandwidth of the electromagnetic wave received by the first antenna pattern 46 may be shifted. The frequency or the frequency bandwidth of the electromagnetic wave is adjusted by, for example, the capacitor 27.

The wireless antenna 23 sends data received from the wireless communication host device 13 to the communication controller 24. Furthermore, the wireless antenna 23 sends data received from the communication controller 24 to the wireless communication host device 13.

That is, the communication controller 24 can communicate with the wireless communication host device 13 through the wireless antenna 23. The communication controller 24 controls NFC with the wireless communication host device 13 using the wireless antenna 23.

The communication controller 24 can be operated with power that is generated by the wireless antenna 23 by the electromagnetic induction. The communication controller 24 receives a signal or data that is represented by a current or a voltage generated by the wireless antenna 23 based on the electromagnetic wave from the wireless communication host device 13, and is operated in accordance with the signal or data. For example, the communication controller 24, when operated, receives data from the wireless communication host device 13 through the wireless antenna 23 at a predetermined frequency corresponding to NFC and writes the data into the storage unit 24a. In addition, the communication controller 24, when operated, reads data written in the storage unit 24a and sends the data to the wireless communication host device 13 through the wireless antenna 23. More specifically, the communication controller 24 can perform NFC when the communication controller 24 receives a signal of a predetermined frequency corresponding to NFC through the wireless antenna 23.

The communication controller 24, when performing data writing in the flash memory 25, sends data received from the host device 12 through the I/F terminal 22 to the memory controller 26. The communication controller 24, when performing data reading from the flash memory 25, sends data received from the memory controller 26 to the host device 12 through the I/F terminal 22.

A sufficient amount of power should be supplied to the communication controller 24 when, for example, the SD card 11 is electrically connected to the host device 12. In this case, the communication controller 24 may write, into the flash memory 25 through the memory controller 26, data that is received by NFC from the wireless communication host device 13 through the wireless antenna 23.

When a sufficient amount of power is supplied to the communication controller 24, the communication controller 24 may read data written in the flash memory 25 through the memory controller 26 and may write the data into the storage unit 24a.

Also, when a sufficient amount of power is supplied to the communication controller 24, the communication controller 24 may read a part or the entirety of data written in the flash memory 25 through the memory controller 26 and may send the read data to the wireless communication host device 13 through the wireless antenna 23.

The storage unit 24a is a low-power-consuming memory that can be operated by power generated by the wireless antenna 23. The storage unit 24a is, for example, a nonvolatile memory. The storage unit 24a stores data based on control of the communication controller 24 or the memory controller 26. The storage unit 24a may be a (volatile) memory that temporarily stores data. The storage unit 24a is, for example, an electrically erasable programmable read-only memory (EEPROM). The storage unit 24a may be other types of memory.

As described above, the communication controller 24 and the storage unit 24a can be operated with power that is generated in the wireless antenna 23 by the electromagnetic wave from the wireless communication host device 13. The communication controller 24 and the storage unit 24a may be operated with power supplied from the host device 12 when the SD card 11 is supplied with power from the host device 12.

The voltage detector 24b monitors a level of voltage supplied from the wireless antenna 23 to the communication controller 24 and continues to output a reset signal for NFC communication until the voltage reaches a predetermined value. As a result, a faulty start and faulty operation of NFC communication can be prevented.

The flash memory 25 is, for example, a NAND-type flash memory. A nonvolatile memory is not limited to a NAND-type flash memory and may be another nonvolatile memory such as a NOR-type flash memory, a magnetoresistive random access memory (MRAM), a phase change random access memory (PRAM), a resistive random access memory (ReRAM), or a ferroelectric random access memory (Fe-RAM).

The memory controller 26 controls writing and reading of data with respect to the flash memory 25. More specifically, when the memory controller 26 receives a write instruction and data from the host device 12 through the I/F terminal 22 and the communication controller 24, the memory controller 26 writes the data into the flash memory 25. When the memory controller 26 receives a read instruction from the host device 12 through the I/F terminal 22 and the communication controller 24, the memory controller 26 reads data from the flash memory 25 and sends the data to the host device 12 through the communication controller 24 and the I/F terminal 22.

A sufficient amount of power should be supplied to the memory controller 26 when, for example, the SD card 11 is electrically connected to the host device 12. In this case, the memory controller 26 may write, into the flash memory 25, data that is received from the wireless communication host device 13 through the wireless antenna 23 and the communication controller 24. When a sufficient amount of power is supplied to the memory controller 26, the memory controller 26 may send data read from the flash memory 25 to the wireless communication host device 13 through the communication controller 24 and the wireless antenna 23.

The flash memory 25 and the memory controller 26 are operated with power supplied from the host device 12.

The capacitor 27 includes, for example, two terminals. One terminal is electrically connected to one end of the wireless antenna 23. The other terminal is electrically connected to the other end of the wireless antenna 23.

The capacitor 27 adjusts the frequency of a current or a voltage generated in the wireless antenna 23. More specifically, the capacitor 27 adjusts a shift in the frequency of NFC that is caused by a part of the first antenna pattern 46 and a part of the inside 46a of the wireless antenna 23 overlying the first substrate 41 in the direction along the Y axis.

The above data may be, for example, data that is sent and received between the wireless communication host device 13 and the SD card 11 in accordance with the NFC interface, feature data of data written in the flash memory 25, feature data that is received by the communication controller 24 from the wireless communication host device 13 through the wireless antenna 23, feature data that is related to the flash memory 25, or feature data that is related to the SD card 11. More specifically, the data may be, for example, a partial (for example, initial or last) data of image data written in the flash memory 25, thumbnail data, management information for data written in the flash memory 25, the memory capacity of the flash memory 25, the remaining capacity of the flash memory 25, the name of a file written in the flash memory 25, the time when the data was generated, data of image captured time when the data is image data, or the number of files written in the flash memory 25.

The write instruction and the data from the host device 12 are first received by the communication controller 24 and are then received by the memory controller 26 in the present embodiment. The reason is that a determination of whether the communication controller 24 receives the write instruction and the data from the host device 12 or from the wireless communication host device 13 is first performed, and the following operation is differentiated according to the determination result.

As described above, the SD card 11 sends data to and receives data from the wireless communication host device 13 using power that is generated by the electromagnetic induction at the wireless antenna 23. Specifically, magnetic flux passing through the inside 46a of the first antenna pattern 46 of the wireless antenna 23 during the NFC causes the first antenna pattern 46 to generate power and causes the communication controller 24 to receive a signal or data that is represented by a current or a voltage generated by the first antenna pattern 46. Furthermore, the communication controller 24 generates magnetic flux that passes through the inside 46a of the first antenna pattern 46 of the wireless antenna 23, thereby sending data to the wireless communication host device 13.

When the first surface 41a of the first substrate 41 is viewed as illustrated in FIG. 3, a part of the inside 46a of the first antenna pattern 46 is positioned outside of the first substrate 41. Thus, magnetic flux that passes through the inside 46a of the first antenna pattern 46 is less likely to be interfered by the first substrate 41 and the communication controller 24, the flash memory 25, and the memory controller 26 mounted on the first substrate 41.

The first antenna pattern 46 of the antenna module 42 is connected to the first substrate 41 in the SD card 11 according to the first embodiment. Generally, a loop antenna such as the first antenna pattern 46 is less expensive than a chip antenna. Thus, an increase in the manufacturing cost of the SD card 11 is prevented, compared with when a chip antenna instead of the first antenna pattern 46 is mounted on the first substrate 41. Furthermore, the area in which the first antenna pattern 46, which is a loop antenna, generates magnetic flux is wider than an area in which a chip antenna generates magnetic flux. As a result, a NFC communication range can become wider. Furthermore, when the first surface 41a is viewed as illustrated in FIG. 3, at least a part of the first antenna pattern 46 is positioned outside of the first substrate 41. For that reason, magnetic flux that is generated by the first antenna pattern 46 is less likely to be interfered by the pattern of the first substrate 41 and electronic components such as the flash memory 25 mounted on the first substrate 41. Furthermore, the first substrate 41 which is a PCB can have a small size, and an increase in the manufacturing cost of the SD card 11 can be prevented.

When the first surface 41a is viewed as illustrated in FIG. 3, at least a part of the first antenna pattern 46 is positioned outside of the first substrate 41. For that reason, magnetic flux that passes through the inside 46a of the first antenna pattern 46 is less likely to be interfered by the pattern of the first substrate 41 and electronic components such as the flash memory 25 mounted on the first substrate 41.

The SD card 11 includes the second substrate 45 in which the first antenna pattern 46 is mounted and that is different from the first substrate 41. Thus, the antenna module 42 that includes the first antenna pattern 46 mounted on the second substrate 45 may be manufactured in advance independently of the first substrate 41. Coupling the antenna module 42 with the first substrate 41 causes the first antenna pattern 46 to be connected to the first substrate 41.

The first antenna pattern 46 is electrically connected to the circuit C by soldering the plurality of third pads 75 to the plurality of first pads 71. Furthermore, the fourth pad 76 of the second substrate 45 is soldered to the second pad 72 provided in the first substrate 41. Accordingly, the antenna module 42 is securely attached to the first substrate 41, compared with when, for example, only the third pad 75 is soldered to the first pad 71. Furthermore, electrical connection between the first substrate 41 and the first antenna pattern 46 can be retained even if accuracy of the dimensions of the first and second recess portions 55 and 56, which determines the positions of the first substrate 41 and the antenna module 42, is low.

At least one of the plurality of third pads 75 and the fourth pads 76 is provided in the second part P2, and at least another one of the plurality of third pads 75 and the fourth pads 76 is provided in the third part P3. Accordingly, the second substrate 45 is less likely to be separated from the first substrate 41, and the plurality of first pads 71 is less likely to be separated from the plurality of third pads 75.

The second substrate 45 is thinner than the first substrate 41. Accordingly, the SD card 11 would not become thick even though the first antenna pattern 46 mounted on the second substrate 45 overlies the first substrate 41.

Generally, influence on the magnetic flux of the first antenna pattern 46 by the overlap of the first antenna pattern 46 with the first substrate 41 is less than influence on the magnetic flux of the first antenna pattern 46 by the overlap of the inside 46a of the first antenna pattern 46 with the first substrate 41. When the first surface 41a is viewed as illustrated in FIG. 3, at least a part of the first antenna pattern 46 overlies the first substrate 41 (is positioned in the first substrate 41) in the present embodiment. Thus, the magnetic flux of the first antenna pattern 46 is less likely to be interfered by the first substrate 41 when the first antenna pattern 46 and the inside 46a of the first antenna pattern 46 are formed large.

The first recess portion 55 accommodating the first substrate 41 and the second recess portion 56 accommodating the antenna module 42 and the first antenna pattern 46 of the antenna module 42 are provided in the bottom cover 32. Since the first substrate 41 and the first antenna pattern 46 are contained in the first and second recess portions 55 and 56, the positions of the first substrate 41 and the first antenna pattern 46 can be determined in the casing 31.

Second Embodiment

Hereinafter, a second embodiment will be described with reference to FIG. 5 to FIG. 11. In the description of a plurality of embodiments below, elements having the same or similar function as previously-described elements will be designated by the same reference signs as the previously-described elements and may not be described further. The plurality of elements designated by the same reference signs may not necessarily have the same functions and properties and may have different functions and properties according to each embodiment.

Figure 5:
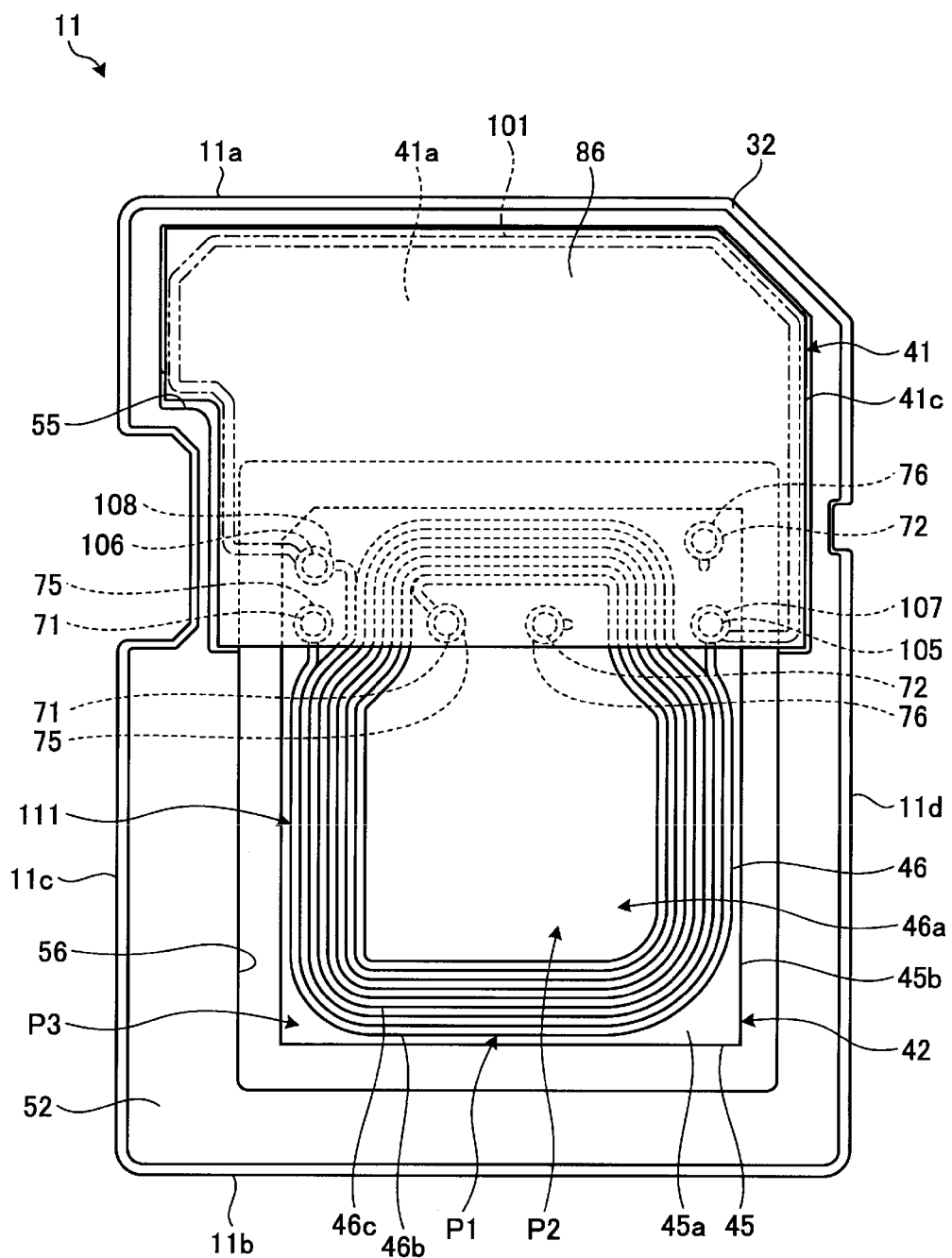
FIG. 5 is a plan view of an SD card according to a second embodiment, from which a top cover is removed.

FIG. 5 is a plan view of the SD card 11 according to the second embodiment, from which the top cover 33 is removed. The first surface 41a of the first substrate 41, the communication controller 24, the flash memory 25, the memory controller 26, the first solder resist 83, and the first opening 84 are covered with the seal resin 86 in the same manner as the first embodiment. The seal resin 86 of the second embodiment is one example of a covering member.

Figure 6:
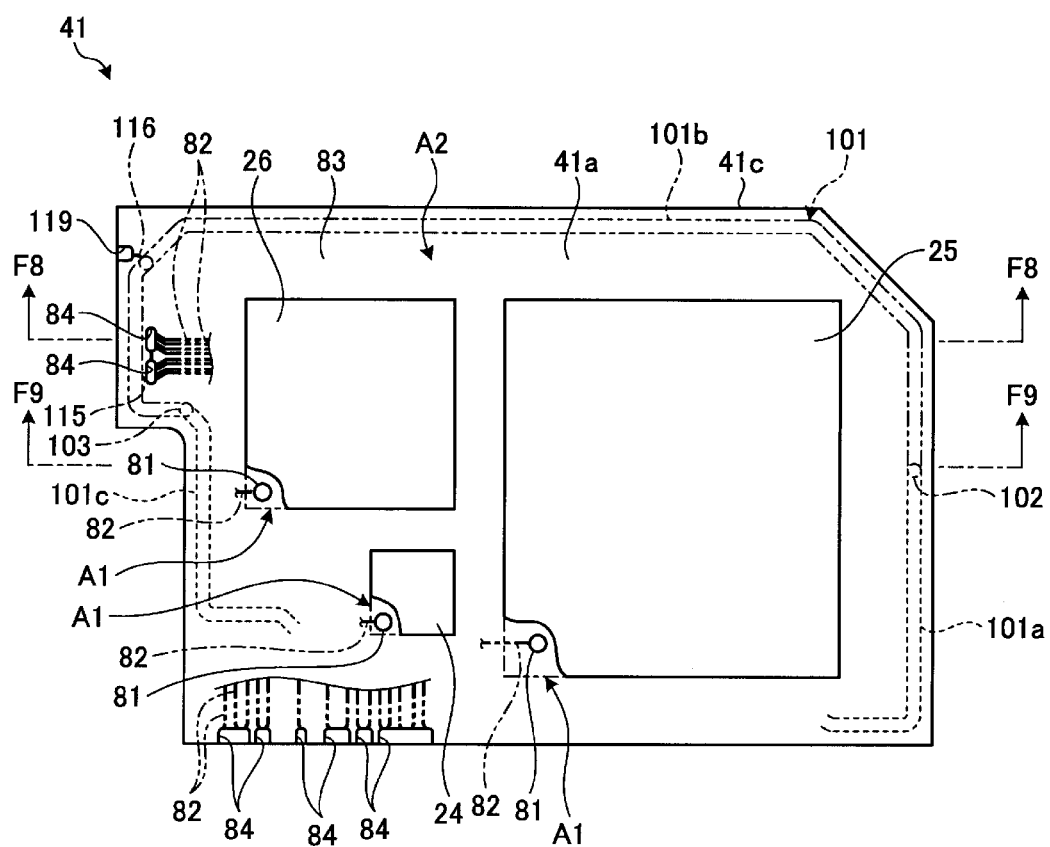
FIG. 6 is a plan view of a first substrate of the SD card according to the second embodiment, from which a seal resin is removed.
Figure 7:
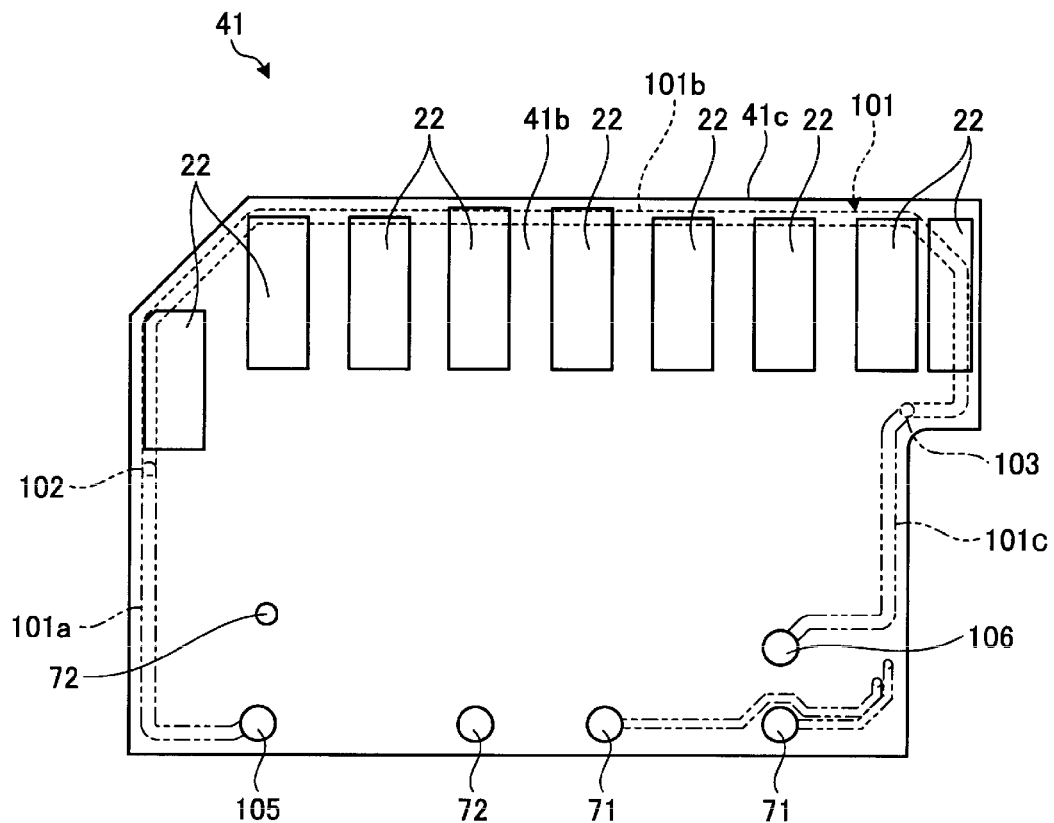
FIG. 7 is a bottom view of the first substrate according to the second embodiment.
Figure 8:
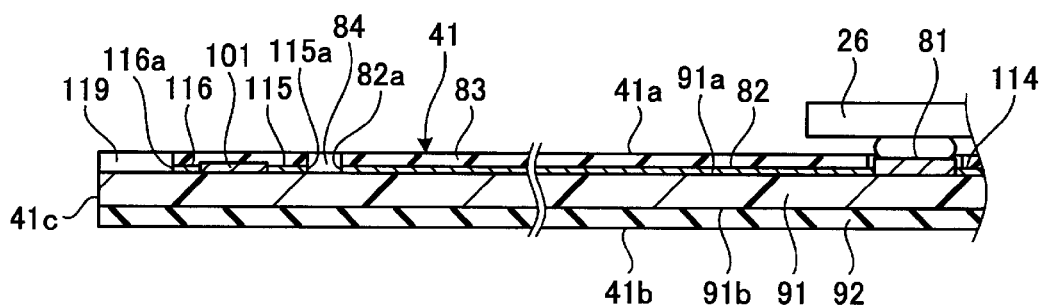
FIG. 8 is a cross-sectional view of a part of the first substrate according to the second embodiment taken along a line F8-F8 in FIG. 6.
Figure 8:
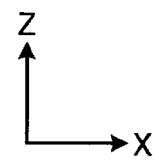

FIG. 6 is a plan view of the first substrate 41 according to the second embodiment, from which the seal resin 86 is removed. FIG. 7 is a bottom view of the first substrate 41 according to the second embodiment. FIG. 8 is a cross-sectional view of a part of the first substrate 41 according to the second embodiment taken along a line F8-F8 in FIG. 6.

As illustrated in FIG. 8, the first substrate 41 includes the first solder resist 83, a base substrate 91, and a second solder resist 92. The base substrate 91 may be referred to as, for example, a base. The first substrate 41 may include more layers than the one illustrated in FIG. 8.

The base substrate 91 is, for example, an insulating board that is formed of paper or glass fabric covered with synthetic resin. The base substrate 91 may be formed of other materials. The base substrate 91 includes a first surface 91a and a second surface 91b. The first surface 91a is one example of a forming surface.

The first surface 91a is an approximately flat surface that faces the top cover 33. The first surface 91a forms a part of the first surface 41a of the first substrate 41. The first surface 91a is covered with the first solder resist 83. The first solder resist 83 according to the second embodiment is one example of a solder resist. The first solder resist 83 forms a part of the first surface 41a of the first substrate 41.

The second surface 91b is an approximately flat surface that faces the bottom cover 32. The second surface 91b is opposite to the first surface 91a. The second surface 91b forms a part of the second surface 41b of the first substrate 41. The second surface 91b is covered with the second solder resist 92. The second solder resist 92 forms a part of the second surface 41b of the first substrate 41.

As illustrated in FIG. 6, the first substrate 41 according to the second embodiment includes a second antenna pattern 101. The second antenna pattern 101 is one example of a second antenna. The second antenna pattern 101 includes a first pattern portion 101a, a second pattern portion 101b, and a third pattern portion 101c. The second pattern portion 101b is one example of first wiring. Each of the first pattern portion 101a and the third pattern portion 101c is one example of second wiring.

The first pattern portion 101a and the third pattern portion 101c illustrated in FIG. 7 are formed on the second surface 91b of the base substrate 91. In other words, the first pattern portion 101a and the third pattern portion 101c are mounted on the second surface 41b of the first substrate 41.

The second pattern portion 101b illustrated in FIG. 6 is provided on the first surface 91a of the base substrate 91. In other words, the second pattern portion 101b is mounted on the first surface 41a of the first substrate 41.

As illustrated in FIG. 7, one end of the first pattern portion 101a is electrically connected to one end of the second pattern portion 101b through a first via 102. One end of the third pattern portion 101c is electrically connected to the other end of the second pattern portion 101b by a second via 103. The first to third pattern portions 101a, 101b, and 101c form one continuous second antenna pattern 101. The second antenna pattern 101 extends adjacent to the end surface 41c of the first substrate 41. The second antenna pattern 101 extends adjacent to, for example, the right side 11d, the front side 11a, and the left side 11c of the SD card 11.

When the second surface 41b of the first substrate 41 is viewed as illustrated in FIG. 7, at least apart of the second pattern portion 101b overlies the plurality of I/F terminals 22. Also, at least a part of the second pattern portion 101b also overlies the plurality of I/F terminals 22.

A fifth pad 105 is formed in the other end of the first pattern portion 101a. A sixth pad 106 is formed in the other end of the third pattern portion 101c. In other words, the fifth and sixth pads 105 and 106 are formed in both ends of the second antenna pattern 101. The fifth and sixth pads 105 and 106 are provided on the second surface 41b of the first substrate 41.

As illustrated in FIG. 5, the first antenna pattern 46 of the antenna module 42 includes a first wound portion 46b and a second wound portion 46c. Each of the first wound portion 46b and the second wound portion 46c is a part of the first antenna pattern 46 that is formed in a coil shape.

The first antenna pattern 46 further includes a seventh pad 107 and an eighth pad 108. The seventh pad 107 and the eighth pad 108 are provided on the connection surface 45a of the second substrate 45.

The seventh pad 107 is provided in one end of the first wound portion 46b of the first antenna pattern 46. One third pad 75 is provided in the other end of the first wound portion 46b. The eighth pad 108 is provided in one end of the second wound portion 46c of the first antenna pattern 46. The other third pad 75 is provided in the other end of the second wound portion 46c.

As described above, the first antenna pattern 46 is formed in a coil shape. The pattern of the first antenna pattern 46 includes the first wound portion 46b and the second wound portion 46c in the second embodiment.

The seventh pad 107 and the eighth pad 108 are provided in the third part P3 of the second substrate 45. At least one of the seventh pad 107 and the eighth pad 108 may be provided in the second part P2.

The seventh pad 107 of the second substrate 45 is soldered to the fifth pad 105 of the first substrate 41. Furthermore, the eighth pad 108 of the second substrate 45 is soldered to the sixth pad 106 of the first substrate 41.

By soldering the seventh pad 107 to the fifth pad 105, the first wound portion 46b of the first antenna pattern 46 is electrically connected to the first pattern portion 101a of the second antenna pattern 101. Furthermore, by soldering the eighth pad 108 to the sixth pad 106, the second wound portion 46c of the first antenna pattern 46 is electrically connected to the third pattern portion 101c of the second antenna pattern 101. In other words, the first antenna pattern 46 is electrically connected to the second antenna pattern 101.

The second antenna pattern 101 is connected to the first antenna pattern 46 and forms a loop antenna 111 along with the first antenna pattern 46. That is, the loop antenna 111 includes one third pad 75, the first wound portion 46b, the seventh pad 107, the fifth pad 105, the first pattern portion 101a, the first via 102, the second pattern portion 101b, the second via 103, the third pattern portion 101c, the sixth pad 106, the eighth pad 108, the second wound portion 46c, and the other third pad 75 that are electrically connected to one another. The wireless antenna 23 in FIG. 2 includes the loop antenna 111 in the second embodiment.

The loop antenna 111 is formed by using a conductor (the first antenna pattern 46 and the second antenna pattern 101) that surrounds the inside region of the loop antenna 111. Any conductor that surrounds the inside region of the loop antenna 111 may be used for the loop antenna 111, and the conductor maybe wound less than once. In other words, the inside region of the loop antenna 111 may be connected with the outside region of the loop antenna 111. The conductor maybe wound a plurality of times. Applying a voltage to an end of the conductor causes the loop antenna 111 to generate magnetic flux that passes through the inside of the loop antenna 111. In addition, the magnetic flux passing through the inside of the loop antenna 111 generates a voltage in the conductor. The loop antenna 111 communicates with an external device by the electromagnetic induction.

As illustrated in FIG. 6, the first substrate 41 includes a plurality of first regions A1 and a second region A2. Each of the plurality of first regions A1 and the second region A2 may be referred to as, for example, a part or an area. The plurality of first regions A1 and the second region A2 are surrounded by the loop antenna 111.

Each of the plurality of first regions A1 is a part of the first substrate 41 that overlies at least one of the communication controller 24, the flash memory 25, and the memory controller 26, when the first surface 41a of the first substrate 41 is viewed as illustrated in FIG. 6.

Each of the first regions A1 is surrounded by the second region A2 and is separated from the loop antenna 111. In other words, the communication controller 24, the flash memory 25, and the memory controller 26 are separated from the loop antenna 111. At least one of the communication controller 24, the flash memory 25, and the memory controller 26 may be adjacent to the loop antenna 111.

The second region A2 is a part of the first substrate 41 that is surrounded by the loop antenna 111 and is different from the plurality of first regions A1 when the first surface 41a is viewed as illustrated in FIG. 6. That is, the part of the first substrate 41 surrounded by the loop antenna 111 includes the plurality of first regions A1 and the second region A2. Another region different from the first and second regions A1 and A2 may be provided in the part of the first substrate 41 surrounded by the loop antenna 111.

Figure 9:
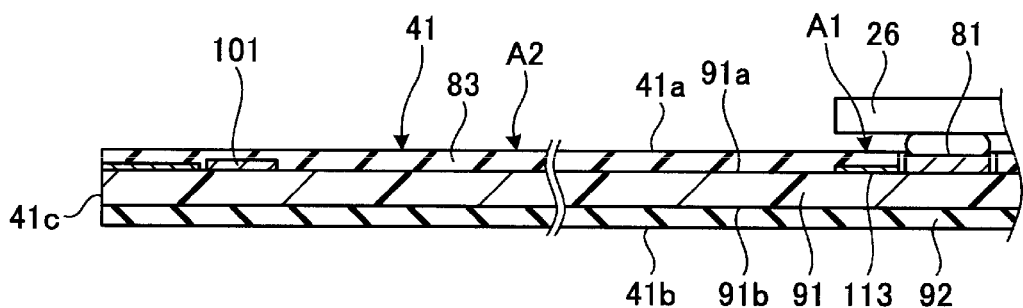
FIG. 9 is a cross-sectional view of a part of the first substrate according to the second embodiment taken along a line F9-F9 in FIG. 6.
Figure 9:
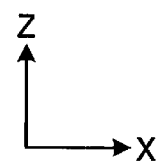

FIG. 9 is a cross-sectional view of a part of the first substrate 41 according to the second embodiment taken along a line F9-F9 in FIG. 6. As illustrated in FIG. 9, a ground terminal 113 is provided in the first substrate 41. The ground terminal 113 may be referred to as, for example, a ground pattern, a ground layer, or a conductor. The ground terminal 113, for example, is provided on the first surface 91a of the base substrate 91. The ground terminal 113 may be provided on the second surface 91b.

The ground terminal 113 is provided in each of the plurality of first regions A1. In other words, the ground terminal 113 is provided outside of the second region A2. A part of the ground terminal 113 may be provided in the second region A2. Furthermore, the ground terminal 113 may be provided in the part of the first substrate 41 surrounded by the loop antenna 111.

As illustrated in FIG. 6, the first lead 82 extends from each of the plurality of connection pads 81. The first lead 82 that extends from the connection pad 81 is partially illustrated in FIG. 6. Furthermore, FIG. 6 illustrates a part of first leads 82 that extend from the connection pads 81 and is hidden below the communication controller 24, the flash memory 25, and the memory controller 26.

The plurality of first leads 82 is formed on the first surface 91a. That is, the first solder resist 83 covers the first lead 82. FIG. 6 illustrates the first lead 82 with a double-dot chain line for description.

Some first leads 82 extend from the corresponding connection pads 81 to the second antenna pattern 101. Some other first leads 82 extend to the end of the first surface 41a of the first substrate 41. Each of the plurality of first leads 82 may include a plurality of curved portions.

Figure 10:
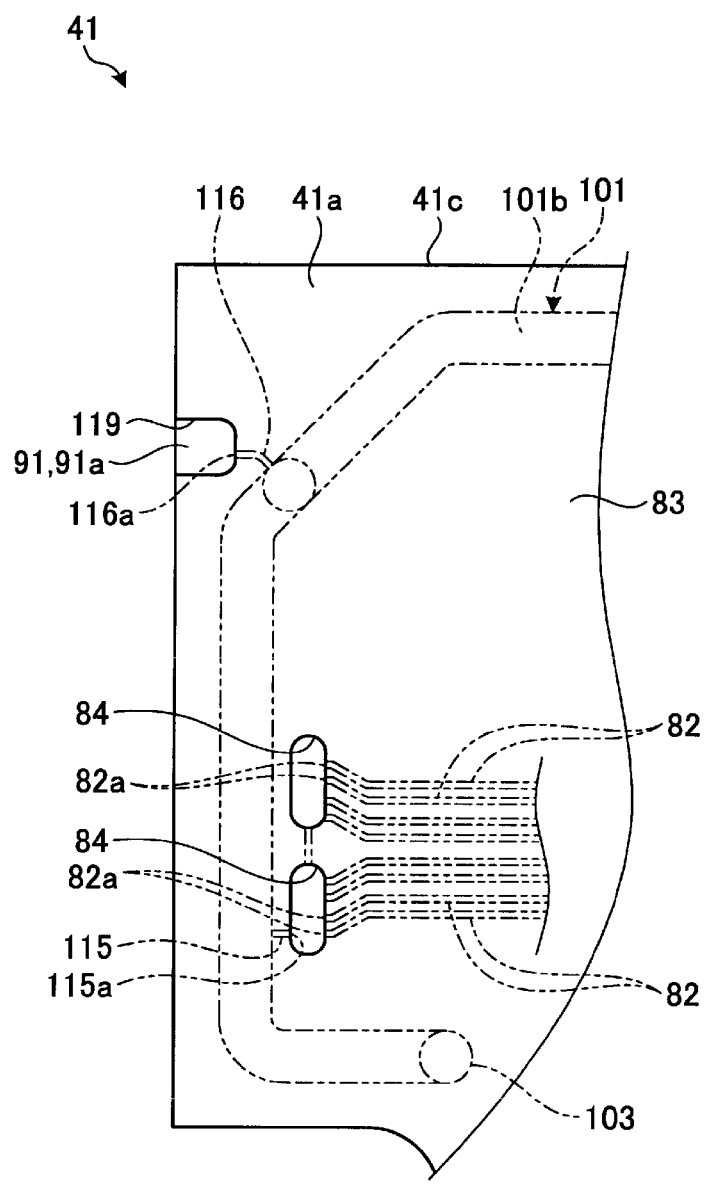
FIG. 10 is a plan view of a part of the first substrate according to the second embodiment.

FIG. 10 is a plan view of a part of the first substrate 41 according to the second embodiment. As illustrated in FIG. 10, each of the plurality of first leads 82 includes a first end portion 82a. The first end portion 82a is an end portion of the first lead 82 that extends from the connection pad 81. In other words, the first end portion 82a is positioned on the opposite end of the connection pad 81.

The first end portion 82a is apart from other conductors including the second antenna pattern 101. Specifically, the first end portion 82a of the first lead 82 is apart from a conductive part of a member or a component that is different from the first lead 82. Thus, the first lead 82 is electrically separated from other conductors that are different from the connection pad 81.

When the first surface 41a of the first substrate 41 is viewed as illustrated in FIG. 10, the first end portion 82a substantially overlies the edge of the first solder resist 83 that forms the first opening 84. The first end portion 82a may be arranged in other positions. The first opening 84 is a hole in the second embodiment. The first opening 84 may be a notch.

As illustrated in FIG. 8, wiring 114 is formed on the first substrate 41. The wiring 114 is one example of a first conductive pattern. The wiring 114, for example, is formed on the first surface 91a of the base substrate 91 and extends from the connection pad 81. In other words, the wiring 114 is connected to the connection pad 81.

The wiring 114 is electrically connected to the connection pad 81 and other conductors that are different from the connection pad 81. For example, the wiring 114 that extends from the connection pad 81 in which the communication controller 24 is mounted is electrically connected to the connection pad 81 and the first pad 71. The wiring 114 that extends from the connection pad 81 in which the flash memory 25 is mounted is electrically connected to the connection pad 81 and the connection pad 81 in which the memory controller 26 is mounted. The wiring 114 may connect the connection pad 81 with another conductor such as the I/F terminal 22, the capacitor 27, another electronic component, or another terminal.

A second lead 115 extends from the second antenna pattern 101. The second lead 115 is formed on the first surface 91a. For that reason, the first solder resist 83 covers the second lead 115. FIG. 10 illustrates the second lead 115 with a double-dot chain line for description.

The second lead 115 includes a second end portion 115a. The second end portion 115a is an end portion of the second lead 115 that extends from the second antenna pattern 101. In other words, the second end portion 115a is positioned opposite to the second antenna pattern 101.

The second end portion 115a is separated from other conductors including the first end portion 82a of the first lead 82. Thus, the second lead 115 is electrically separated from other conductors that are different from the second antenna pattern 101. When the first surface 41a of the first substrate 41 is viewed as illustrated in FIG. 10, the second end portion 115a substantially overlies the edge of the first solder resist 83 that forms the first opening 84. The second end portion 115a may be arranged in other positions.

The number of first leads 82 is greater than the number of second leads 115. The first end portions 82a of the plurality of first leads 82 substantially overlie the second end portion 115a of one second lead 115 on the edge of the first solder resist 83 that forms one first opening 84. The first opening 84 overlies the region between the first end portion 82a of the first lead 82 and the second end portion 115a of the second lead 115 when the first surface 41a of the first substrate 41 is viewed as illustrated in FIG. 10.

A third lead 116 extends from the second antenna pattern 101. The third lead 116 is formed on the first surface 91a. For that reason, the first solder resist 83 covers the third lead 116. FIG. 10 illustrates the third lead 116 with a double-dot chain line for description.

The third lead 116 is positioned between the second antenna pattern 101 and the end surface 41c of the first substrate 41. The third lead 116 extends from the second antenna pattern 101 to the end surface 41c of the first substrate 41. In other words, the third lead 116 extends from the second antenna pattern 101 to the end of the first surface 41a of the first substrate 41.

The third lead 116 includes a third end portion 116a. The third end portion 116a is an end portion of the third lead 116 that extends from the second antenna pattern 101. In other words, the third end portion 116a is positioned opposite to the second antenna pattern 101.

A second opening 119 is formed in the first solder resist 83. The second opening 119 is, for example, a notch that extends from the end of the first surface 41a of the first substrate 41. The second opening 119 may be a hole.

When the first surface 41a of the first substrate 41 is viewed as illustrated in FIG. 10, the third end portion 116a of the third lead 116 substantially overlies the edge of the first solder resist 83 that forms the second opening 119. The third end portion 116a is separated from other conductors. Thus, the third lead 116 is electrically separated from other conductors that are different from the second antenna pattern 101. The third end portion 116a may be arranged in other positions. The second opening 119 is covered with the seal resin 86 in the same manner as the first opening 84.

As described above, the first to third leads 82, 115, and 116 are mounted on the first surface 91a of the first substrate 41 in the present embodiment. The first to third leads 82, 115, and 116 may be mounted on another location such as the second surface 91b.

As described above, the fifth pad 105 and the sixth pad 106 are formed in both end portions of the second antenna pattern 101. In other words, the fifth and sixth pads 105 and 106 are connected to the second antenna pattern 101.

The fifth pad 105 electrically connects the second antenna pattern 101 with the seventh pad 107. The sixth pad 106 electrically connects the second antenna pattern 101 with the eighth pad 108. Each of the fifth and sixth pads 105 and 106 is one example of a second conductive pattern that electrically connects the second antenna pattern 101 with other conductors different from the second antenna pattern 101. The second conductive pattern is not limited to the fifth and sixth pads 105 and 106 and may be other conductive patterns.

Hereinafter, a part of a method for manufacturing the first substrate 41 of the second embodiment will be illustrated. A method for manufacturing the first substrate 41 is not limited to the method below and may use other methods.

Figure 11:
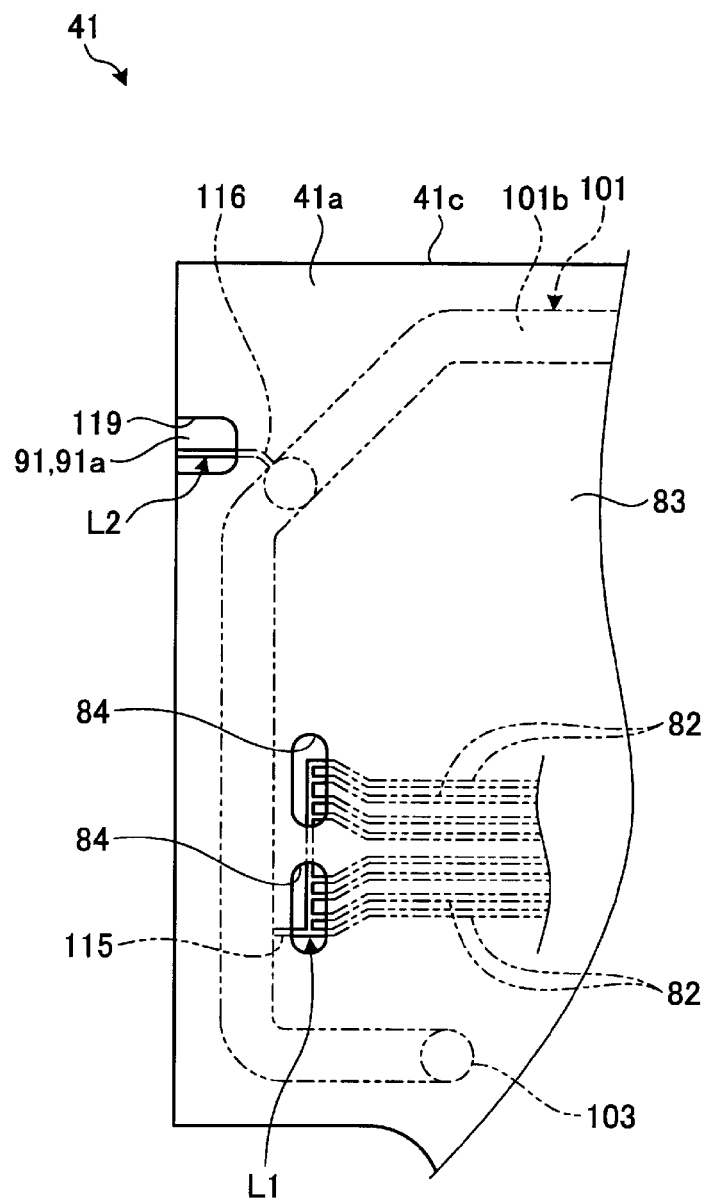
FIG. 11 is a plan view of a part of the first substrate during a process of manufacturing processes according to the second embodiment.
Figure 11:
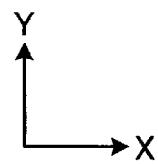

FIG. 11 is a plan view of a part of the first substrate 41 at a process of manufacturing processes according to the second embodiment. A first plated lead L1 and a second plated lead L2 illustrated in FIG. 11 are provided on the first surface 91a of the base substrate 91 before the plurality of connection pads 81 is formed in the first substrate 41.

The plurality of connection pads 81 and a plurality of other pads are formed by electroplating on the base substrate 91 in which the first and second plated leads L1 and L2 are provided. The first and second plated leads L1 and L2 are provided in order to form the plurality of connection pads 81 and the plurality of other pads by, for example, electroplating.

The first plated lead L1 includes the plurality of first leads 82 and the second lead 115. In other words, the plurality of first leads 82 and the second lead 115 that are connected to each other form the first plated lead L1.

The first plated lead L1 extends from the second antenna pattern 101, includes a plurality of branching parts, and is connected to the plurality of connection pads 81. In other words, the connection pad 81 is formed in a plurality of end portions of the first plated lead L1 by electroplating.

The second plated lead L2 includes the third lead 116. The second plated lead L2 extends from the second antenna pattern 101 to the end surface 41c of the first substrate 41. The second plated lead L2 is electrically connected to the plurality of connection pads 81 through the second antenna pattern 101 and the first plated lead L1. In other words, the second plated lead L2, the second antenna pattern 101, the first plated lead L1, and the plurality of connection pads 81 have the same electrical potential. The second plated lead L2, the second antenna pattern 101, the first plated lead L1, and the plurality of connection pads 81 may have different electrical potentials.

The second plated lead L2 is connected to a power source when the connection pad 81 is formed by electroplating. For example, before a plurality of first substrates 41 is cut out of one aggregate substrate, a lead that is connected to the second plated lead L2 of each of the first substrates 41 is formed on the aggregate substrate that includes the plurality of first substrates 41. Clamping the aggregate substrate to a jig connected to a power source causes a voltage to be applied to the second plated lead L2 through the lead. Applying a voltage to the first plated lead L1 through the second plated lead L2 and the second antenna pattern 101 forms the connection pad 81 by electroplating. The aggregate substrate may be referred to as a frame, a strip, a sheet, or an aggregate.

A part of the first plated lead L1 is exposed at the plurality of first openings 84. The first opening 84 exposes, for example, a connection portion at which the plurality of first leads 82 is connected with the second lead 115 (branching part). A part of the second plated lead L2 is exposed at the second opening 119.

When the plurality of connection pads 81 is formed, a part of the first plated lead L1 and a part of the second plated lead L2 are removed by, for example, etchback. The first plated lead L1 is etched back through the first opening 84, thereby being formed into the plurality of first leads 82 and the second lead 115. The second plated lead L2 is etched back through the second opening 119 and thereby forms the third lead 116. As a result, the plurality of connection pads 81 is electrically separated from the second antenna pattern 101.

Next, the communication controller 24, the flash memory 25, and the memory controller 26 are electrically connected to the formed plurality of connection pads 81 by soldering. Then, the seal resin 86 is formed to cover the first surface 41a of the first substrate 41, the communication controller 24, the flash memory 25, the memory controller 26, the first solder resist 83, the first opening 84, and the second opening 119. The first substrate 41 is manufactured as described above.

The second antenna pattern 101 that forms one loop antenna 111 along with the first antenna pattern 46 is formed on the first substrate 41 in the SD card 11 of the second embodiment. For that reason, the area in which magnetic flux is generated from the first antenna pattern 46 and the second antenna pattern 101 is enlarged in the direction along the X axis and the direction along the Y axis, and a communicable range using the magnetic flux is enlarged, compared with when the SD card 11 includes only the first antenna pattern 46. Furthermore, the amount of magnetic flux that may be captured by the loop antenna 111 is greater than the amount of magnetic flux that may be captured by the first antenna pattern 46, and thus the communicable range using the magnetic flux is enlarged in the direction along the Z axis. Since the communicable range is enlarged, and the communication characteristic of the SD card 11 can be improved.

The second antenna pattern 101 includes the second pattern portion 101b formed on the first surface 91a and the first and third pattern portions 101a and 101c formed on the second surface 91b. Since a part of the second antenna pattern 101 is formed on the second surface 91b, the area in which various electronic components such as the flash memory 25 can be formed on the first surface 41a would not be compromised.

The first substrate 41 includes the first region A1 in which an electronic component such as the flash memory 25 is mounted and in which the ground terminal 113 is provided, and the second region A2 that is different from the first region A1. By providing the second region A2, influence of the communication controller 24, the flash memory 25, the memory controller 26, and the ground terminal 113 on the magnetic flux at the loop antenna 111 that is formed with the first antenna pattern 46 and the second antenna pattern 101 can be reduced.

The first lead 82 extends from the connection pad 81 to which an electronic component such as the flash memory 25 is connected. The first lead 82 is electrically separated from other conductors. Meanwhile, the second lead 115 extends from the second antenna pattern 101. The second lead 115 is electrically separated from other conductors. The first and second leads 82 and 115, for example, are connected during the manufacturing processes of the SD card 11 and form the first plated lead L1. In this case, by applying a voltage to the first and second leads 82 and 115 through the second antenna pattern 101, the connection pad 81 is formed in the end portion of the first lead 82 by electroplating. The first lead 82 and the second lead 115 are split after the connection pad 81 is formed. The connection pad 81 can be formed by electroplating using the first and second leads 82 and 115 on the first substrate 41 in which the second antenna pattern 101 is formed.

The first opening 84 that overlies the region between the first end portion 82a of the first lead 82 and the second end portion 115a of the second lead 115 is provided in the first solder resist 83. As a result, the first lead 82 and the second lead 115 that are connected to each other can be split by, for example, etchback through the first opening 84 in the manufacturing processes of the SD card 11.

The seal resin 86 covers the flash memory 25, the memory controller 26, and the first opening 84 of the first solder resist 83. For that reason, the seal resin 86 protects the flash memory 25, the memory controller 26, and the first surface 91a, and the flash memory 25, the memory controller 26, and the first surface 91a are less likely to be damaged.

The third lead 116 extends from the second antenna pattern 101 between the second antenna pattern 101 and the end surface 41c of the first substrate 41. The third lead 116 is electrically separated from other conductors. The third lead 116, for example, can be connected to a power source during the manufacturing processes of the SD card 11. Then, by applying a voltage to the first lead 82 through the third lead 116, the second antenna pattern 101, and the second lead 115, the connection pad 81 is formed by electroplating. The third lead 116 is split from the lead of the aggregate substrate after the connection pad 81 is formed. The connection pad 81 can be formed by electroplating using the first and second leads 82 and 115 on the first substrate 41 in which the second antenna pattern 101 is formed.

The number of the plurality of first leads 82 is greater than the number of the plurality of second leads 115. The plurality of first leads 82, for example, is connected to corresponding one of the second leads 115 during the manufacturing processes of the SD card 11. By removing the part in which the plurality of first leads 82 is connected with the second lead 115 by, for example, etchback, the plurality of first leads 82 each of which includes the first end portion 82a separated from other conductors, and the second lead 115 that includes the second end portion 115a separated from other conductors are formed. As the number of the second leads 115 does not need to correspond to the number of first leads 82, an increase in the number of second leads 115 can be prevented. Therefore, a region of conductors existing inside of the second antenna pattern 101 is decreased, and influence on the magnetic flux at the loop antenna 111 that is formed with the first antenna pattern 46 and the second antenna pattern 101 can be minimized.

Figure 12:
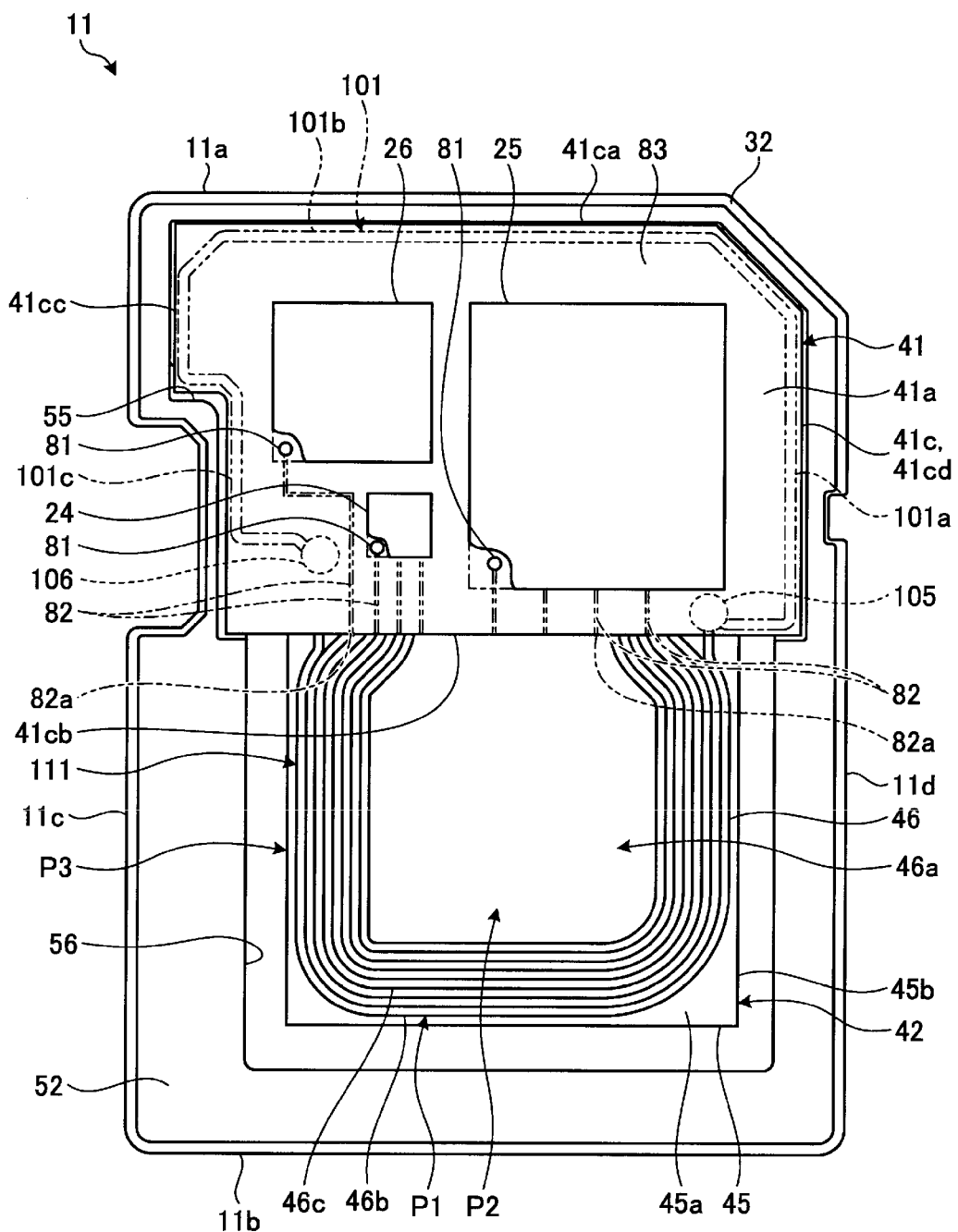
FIG. 12 is a plan view of an SD card according to a modification example of the second embodiment, from which a top cover is removed.

Hereinafter, a modification example of the second embodiment will be described with reference to FIG. 12. FIG. 12 is a plan view of the SD card 11 according to the modification example of the second embodiment, from which the top cover 33 is removed.

As illustrated in FIG. 12, the side surfaces 41c of the first substrate 41 include a front side surface 41ca, a rear side surface 41cb, a left side surface 41cc, and a right side surface 41cd. The naming of the front side surface 41ca, the rear side surface 41cb, the left side surface 41cc, and the right side surface 41cd are based on the position in FIG. 12 and do not limit the directions and other features of the side surfaces 41ca, 41cb, 41cc, and 41cd.

The front side surface 41ca is one side surface of the first substrate 41 in the direction along the Y axis. The I/F terminal 22 is adjacent to the front side surface 41ca. The rear side surface 41cb is the other side surface of the first substrate 41 in the direction along the Y axis and is positioned opposite to the front side surface 41ca. The front side surface 41ca and the rear side surface 41cb extend in the direction along the X axis.

The left side surface 41cc is one side surface of the first substrate 41 in the direction along the X axis. The right side surface 41cd is the other side surface of the first substrate 41 in the direction along the X axis and positioned opposite to the left side surface 41cc. The left side surface 41cc and the right side surface 41cd extend in the direction along the Y axis.

The second antenna pattern 101 extends adjacent to the front side surface 41ca, a part of the rear side surface 41cb, the left side surface 41cc, and the right end surface 41cd of the first substrate 41. The second antenna pattern 101 is open in the part of the end surface 41c adjacent to the rear side surface 41cb. In other words, the inside region of the second antenna pattern 101 is connected with the outside region of the second antenna pattern 101 in the part of the end surface 41c adjacent to the rear side surface 41cb. The shape of the second antenna pattern 101 is not limited thereto.

Each of the plurality of first leads 82 extends from the connection pad 81 to the rear side surface 41cb of the first substrate 41 according to the modification example of the second embodiment. In other words, the first lead 82 extends in the direction apart from the front side surface 41ca to which the I/F terminal 22 is adjacent.

When the first surface 41a of the first substrate 41 is viewed as illustrated in FIG. 12, the first end portion 82a of the first lead 82 substantially overlies the rear side surface 41cb. That is, the first lead 82 extends from the connection pad 81 to the rear side surface 41cb. The first end portion 82a is separated from other conductors including the second antenna pattern 101.

The second antenna pattern 101 may exist on the extension lines of some first leads 82 that extend from the connection pads 81. In this case, the first lead 82 includes at least one curved part and extends along a path that does not intersect with the second antenna pattern 101. In other words, the first lead 82 extends away from the second antenna pattern 101 and is apart from the second antenna pattern 101.

All of the first leads 82 do not intersect with the second antenna pattern 101 and extend from the connection pads 81 to the rear side surface 41cb in the modification example of the second embodiment. The first lead 82 is electrically separated from other conductors that are different from the connection pad 81.

At least one connection pad 81 is closer to one of the front side surface 41ca, the left side surface 41cc, and the right end surface 41cd than to the rear side surface 41cb. That is, the first lead 82 extends from the connection pad 81 to the rear side surface 41cb and not to the front side surface 41ca, the left side surface 41cc, or the right end surface 41cd which is the closest end surface 41c.

The first opening 84 is not provided in the first solder resist 83 in the modification example of the second embodiment. The first opening 84 may be provided in the first solder resist 83, though the first end portion 82a of the first lead 82 overlies the rear side surface 41cb as described above.

The rear side surface 41cb of the first substrate 41 faces the antenna module 42 that includes the first antenna pattern 46. Furthermore, at least a part of the rear side surface 41cb overlies the antenna module 42.

The second antenna pattern 101 is connected to the first antenna pattern 46. In order to increase the inside region of the second antenna pattern 101, the second antenna pattern 101 extends adjacent to the front side surface 41ca, the left side surface 41cc, or the right end surface 41cd that is separated from the first antenna pattern 46. As the first lead 82 extends from the connection pad 81 to the rear side surface 41cb, the first lead 82 can be easily arranged on a path separated from the second antenna pattern 101. The first lead 82 may extend from the connection pad 81 to the front side surface 41ca, the left side surface 41cc, or the right side surface 41cd.

A part of the first lead 82 overlies the inside 46a of the first antenna pattern 46. The first lead 82 is narrower than the conductor forming the first antenna pattern 46. For that reason, the first lead 82 is less likely to influence on the magnetic flux of the first antenna pattern 46.

All of the first leads 82 are separated from the second antenna pattern 101 and extend from the connection pads 81 to the end surface 41c of the first substrate 41 in the SD card according to the modification example of the second embodiment. Since there is no need to electrically separate the first lead 82 and the second antenna pattern 101 by etchback, the number of manufacturing processes and the manufacturing cost for the SD card 11 would not increase.

Third Embodiment

Figure 13:
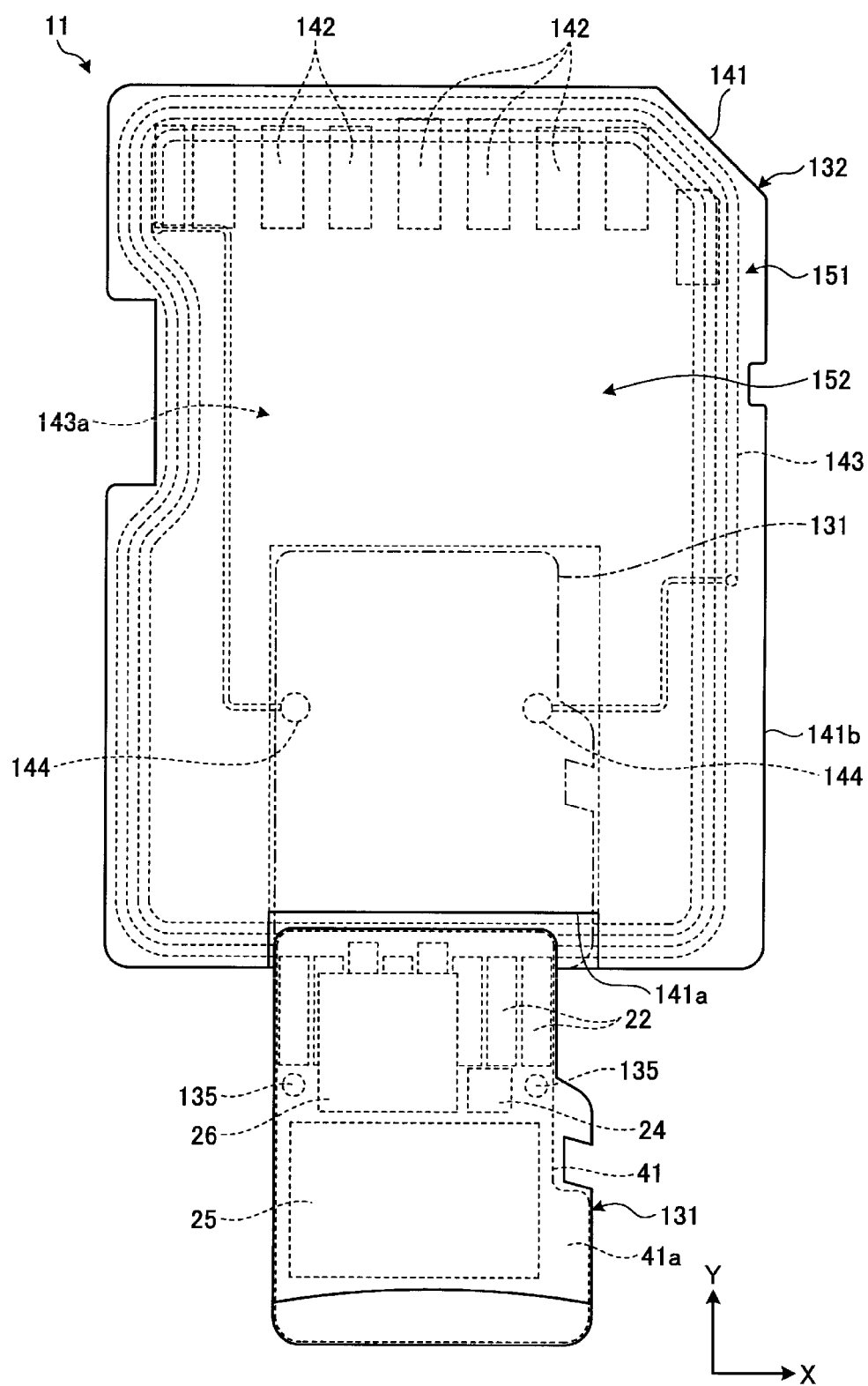
FIG. 13 is a plan view of an SD card according to a third embodiment.

Hereinafter, a third embodiment will be described with reference to FIG. 13. FIG. 13 is a plan view of the SD card 11 according to the third embodiment. As illustrated in FIG. 13, the SD card 11 according to the third embodiment includes a microSD card 131 and an adapter 132. The microSD card 131 that is attached to the adapter 132 is used as a full-size SD card 11.

The microSD card 131 is one example of a semiconductor device and may be referred to as, for example, a device, a module, a unit, a medium, and a component. The semiconductor device maybe another device such as a miniSD card or a USB flash memory.

The microSD card 131 includes the first substrate 41, the plurality of I/F terminals 22, the communication controller 24, the flash memory 25, and the memory controller 26. The I/F terminal 22 in the third embodiment is a microSD interface terminal.

The microSD card 131 can be electrically connected to the host device 12 independently. In the microSD card 131, data can be written by the host device 12, or data can be read by the host device 12.

The microSD card 131 includes two first connection terminals 135. The first connection terminal 135 is provided on the second surface 41b of the first substrate 41 in the same manner as the I/F terminal 22. The two first connection terminals 135 are adjacent to, for example, the plurality of I/F terminals 22. The first connection terminal 135 may be provided in other locations.

The two first connection terminals 135 are electrically connected to, for example, the communication controller 24. The two first connection terminals 135 are exposed to the outside through, for example, openings. The first connection terminal 135 may be included in the I/F terminal 22.

The adapter 132 is an adapter to insert a microSD card into a full-size SD card reader/writer. The adapter may be other adapters such as an adapter for using a miniSD card with a full-size SD card reader/writer, an adapter for using an SD card, a miniSD card, or a microSD card with a USB connector, and an adapter for using a USB A terminal with connectors of other USB standards such as Type-C.

The adapter 132 includes a case 141, a plurality of full-size I/F terminals 142, a loop antenna 143, and two second connection terminals 144. The full-size I/F terminal 142 is one example of a second interface terminal. The loop antenna 143 is one example of the first antenna and an antenna.

The case 141 is formed of, for example, synthetic resin that has non-magnetic and insulating properties. The case 141 may be formed of other materials. The case 141 is formed in an approximately quadrangular box shape.

The full-size I/F terminal 142 is an SD interface terminal. The full-size I/F terminal 142 is provided in one end portion of the case 141 in the direction along the Y axis. The plurality of full-size I/F terminals 142 is lined up in the direction along the X axis. The full-size I/F terminal 142 is exposed to the outside of the case 141.

An insertion port 141a is provided in the case 141. The insertion port 141a is open in the other end portion of the case 141 in the direction along the Y axis. The microSD card 131 is inserted into the insertion port 141a, thereby being detachably attached to the adapter 132.

Inserting the microSD card 131 into the insertion port 141a causes the plurality of I/F terminals 22 of the microSD card 131 to be electrically connected to the corresponding full-size I/F terminals 142. The I/F terminal 22 can be electrically connected with the host device 12 through the full-size I/F terminal 142.

The loop antenna 143 is disposed in the case 141. The loop antenna 143 is formed in a shape that may be referred to as, for example, a coil shape, a spiral shape, or a swirling shape. The loop antenna 143 in the present embodiment is formed of a copper wire wound in a coil shape. The copper wire wound in a coil shape is one example of a wound conductor. The loop antenna 143 may be, for example, a pattern that is formed in a substrate.

The case 141 includes an outer frame region 151 and an inner region 152. The outer frame region 151 is a frame-shaped part that is adjacent to a peripheral end portion 141b of the case 141. The inner region 152 is surrounded by the outer frame region 151.

The loop antenna 143 is arranged in the outer frame region 151 of the case 141. In other words, the loop antenna 143 extends along the peripheral end portion 141b of the case 141. The arrangement of the loop antenna 143 is not limited thereto.

The two second connection terminals 144 are provided in the insertion port 141a. The two second connection terminals 144 are two terminals of the loop antenna 143. One second connection terminal 144 is electrically connected to one end portion of the loop antenna 143. The other second connection terminal 144 is electrically connected to the other end portion of the loop antenna 143.

By inserting the microSD card 131 into the insertion port 141a, the two first connection terminals 135 of the microSD card 131 are electrically connected to the corresponding second connection terminals 144. Accordingly, the communication controller 24 is electrically connected to the loop antenna 143 through the first and second connection terminals 135 and 144.

The communication controller 24 of the third embodiment communicates with the wireless communication host device 13 through the loop antenna 143 instead of the first antenna pattern 46 according to the first embodiment. That is, the wireless antenna 23 in FIG. 2 includes the loop antenna 143 in the third embodiment.

The first antenna pattern 46 of the adapter 132 sends data received from the wireless communication host device 13 to the communication controller 24 of the microSD card 131. Furthermore, the first antenna pattern 46 of the adapter 132 sends data received from the communication controller 24 of the microSD card 131 to the wireless communication host device 13.

FIG. 13 illustrates the microSD card 131 that is inserted in the insertion port 141a with a double-dot chain line. When the first surface 41a of the first substrate 41 is viewed as illustrated in FIG. 13, a part of an inside 143a of the loop antenna 143 is positioned outside of the microSD card 131. The inside 143a of the loop antenna 143 is a region surrounded by the annular loop antenna 143. In addition, when the first surface 41a is viewed as illustrated in FIG. 13, a part of the loop antenna 143 is positioned outside of the first substrate 41.

The microSD card 131 that includes the first substrate 41 is attached to the adapter 132 that includes the loop antenna 143, in the SD card 11 according to the third embodiment. As a result, the microSD card 131 can communicate with the wireless communication host device 13 through the loop antenna 143 of the adapter 132.

The loop antenna 143 is formed of a wound copper wire. For that reason, the manufacturing cost of the SD card 11 can be suppressed, compared with when, for example, the loop antenna 143 is formed of a pattern on a substrate.

Fourth Embodiment

Figure 14:
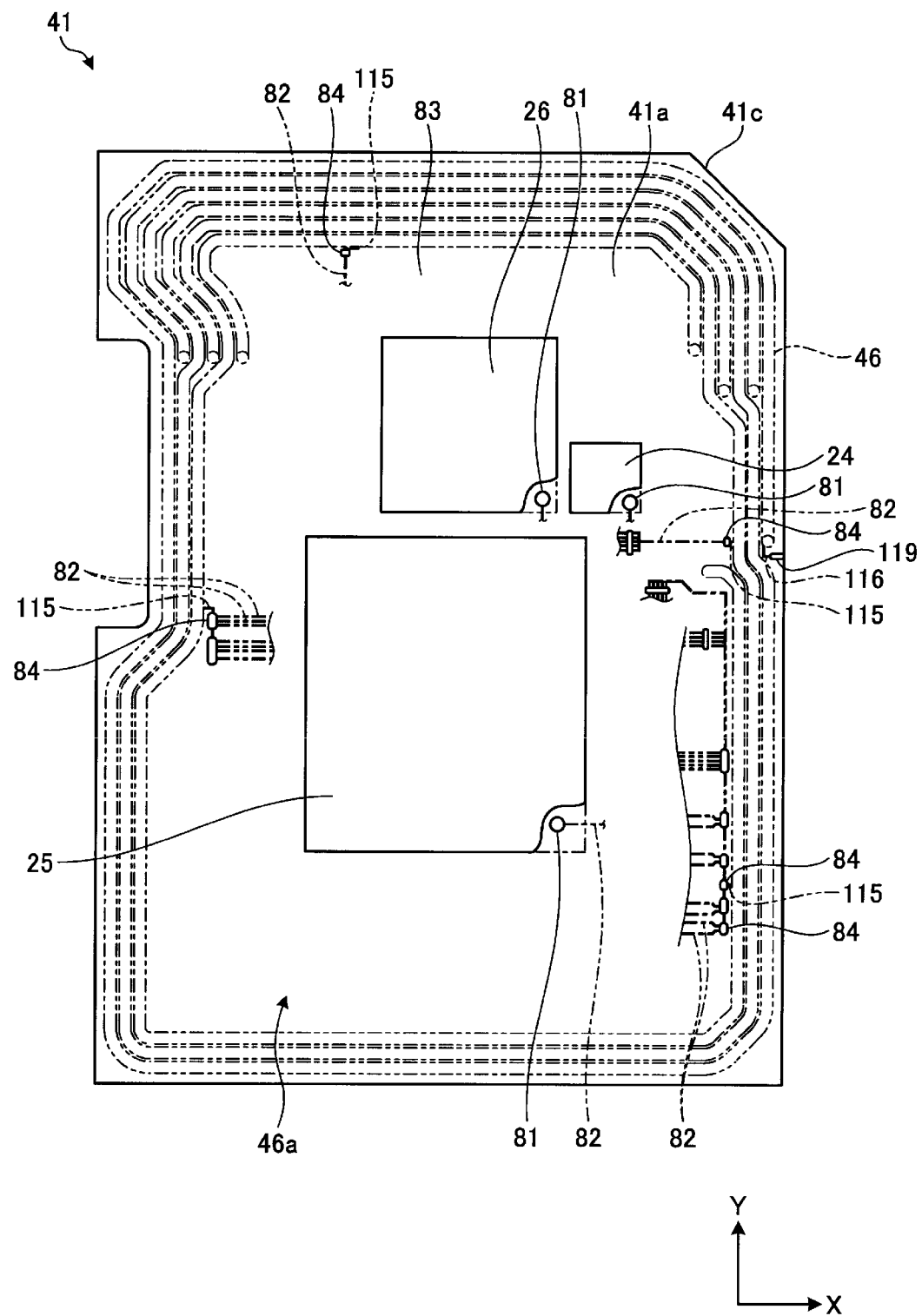
FIG. 14 is a plan view of a first substrate of an SD card according to a fourth embodiment.

Hereinafter, a fourth embodiment will be described with reference to FIG. 14 to FIG. 16. FIG. 14 is a plan view of the first substrate 41 according to the fourth embodiment. As illustrated in FIG. 14, the first antenna pattern 46 is formed on the first substrate 41 in the fourth embodiment. The wireless antenna 23 in FIG. 2 includes the first antenna pattern 46 in the fourth embodiment.

Figure 15:
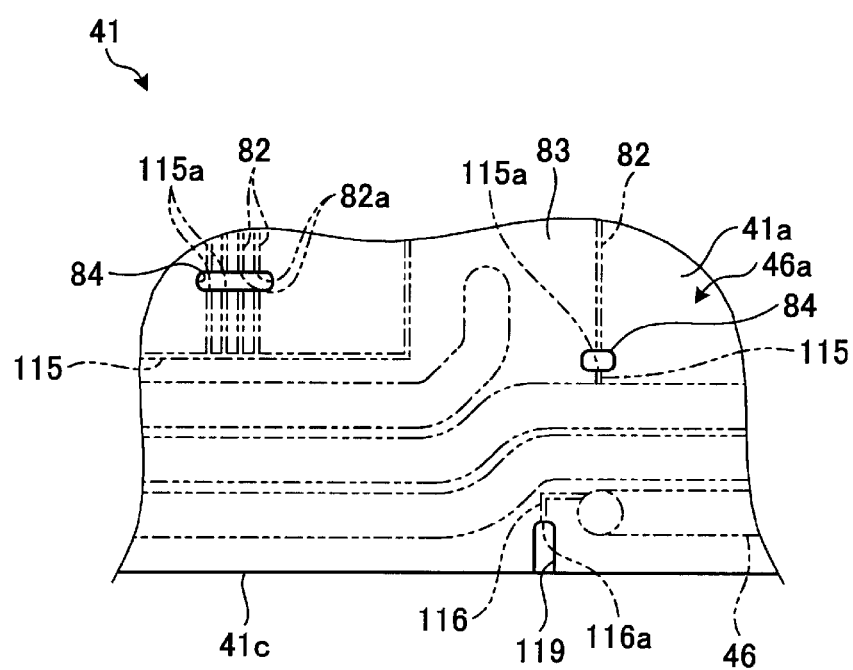
FIG. 15 is a plan view of a part of the first substrate according to the fourth embodiment.

FIG. 15 is a plan view of a part of the first substrate 41 according to the fourth embodiment. As illustrated in FIG. 14 and FIG. 15, the plurality of connection pads 81, the plurality of first leads 82, the first solder resist 83, the second lead 115, and the third lead 116 are formed on the first substrate 41 according to the fourth embodiment in the same manner as the second embodiment. The plurality of first openings 84 and the second opening 119 are formed in the first solder resist 83.

The second lead 115 extends from the first antenna pattern 46 instead of the second antenna pattern 101 according to the second embodiment. The third lead 116 as well extends from the first antenna pattern 46.

Figure 16:
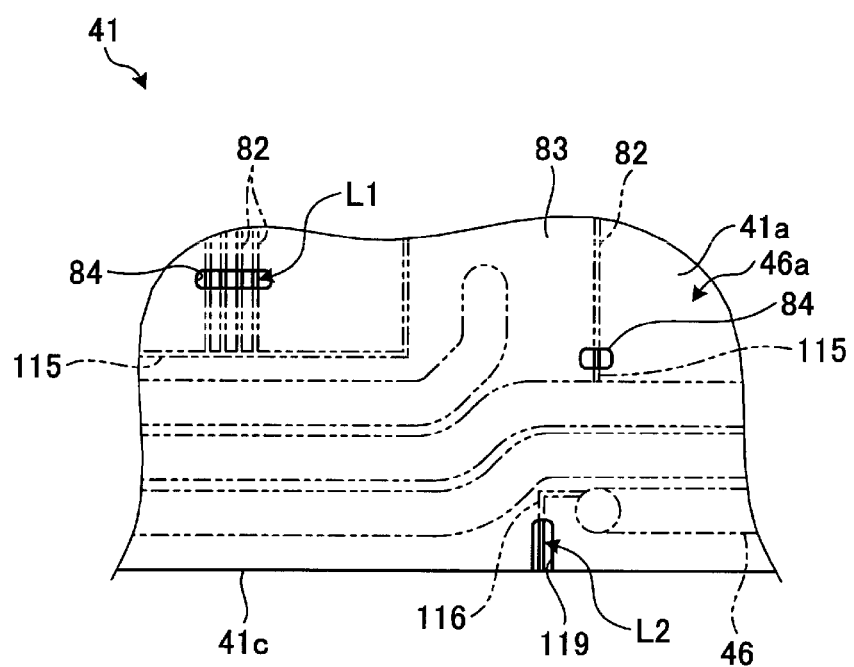
FIG. 16 is a plan view of a part of the first substrate during a process of manufacturing processes according to the fourth embodiment.

FIG. 16 is a plan view of a part of the first substrate 41 during a process of manufacturing processes according to the fourth embodiment. As illustrated in FIG. 16, the first plated lead L1 and the second plated lead L2 are formed on the first surface 91a of the base substrate 91 before the plurality of connection pads 81 is formed in the first substrate 41.

The first plated lead L1 includes the plurality of first leads 82 and the second lead 115. The first plated lead L1 extends from the first antenna pattern 46, includes a plurality of branching parts, and is connected to the plurality of connection pads 81. In other words, the connection pad 81 is formed in the end portion of the first plated lead L1 by electroplating.

The second plated lead L2 includes the third lead 116. The second plated lead L2 extends from the first antenna pattern 46 to the end surface 41c of the first substrate 41. The second plated lead L2 is electrically connected to the plurality of connection pads 81 through the first antenna pattern 46 and the first plated lead L1.

The second plated lead L2 is connected to a power source when the connection pad 81 is formed by electroplating. When the plurality of connection pads 81 is formed, a part of the first plated lead L1 and a part of the second plated lead L2 are removed by, for example, etchback. The first plated lead L1 is etched back through the first opening 84, thereby being split into the plurality of first leads 82 and the second lead 115. The second plated lead L2 is etched back through the second opening 119, thereby forming the third lead 116. As a result, the plurality of connection pads 81 is electrically separated from the first antenna pattern 46.

The first lead 82 in the SD card 11 according to the fourth embodiment extends from the connection pad 81 to which an electronic component such as the flash memory 25 is connected. The first lead 82 is electrically separated from other conductors. Meanwhile, the second lead 115 extends from the first antenna pattern 46. The second lead 115 is electrically separated from other conductors. The first and second leads 82 and 115, for example, are connected during the manufacturing processes of the SD card 11 and form the first plated lead L1. In this case, by applying a voltage to the first and second leads 82 and 115 through the first antenna pattern 46, the connection pad 81 in the end portion of the first lead 82 can be formed by electroplating. The first lead 82 and the second lead 115 are split after the connection pad 81 is formed. The connection pad 81 can be formed by electroplating using the first and second leads 82 and 115 in the first substrate 41 in which the first antenna pattern 46 is formed. For that reason, the first antenna pattern 46 which is a loop antenna and not a chip antenna can be provided in the first substrate 41, and the manufacturing cost of the SD card 11 can be suppressed.

Figure 17:
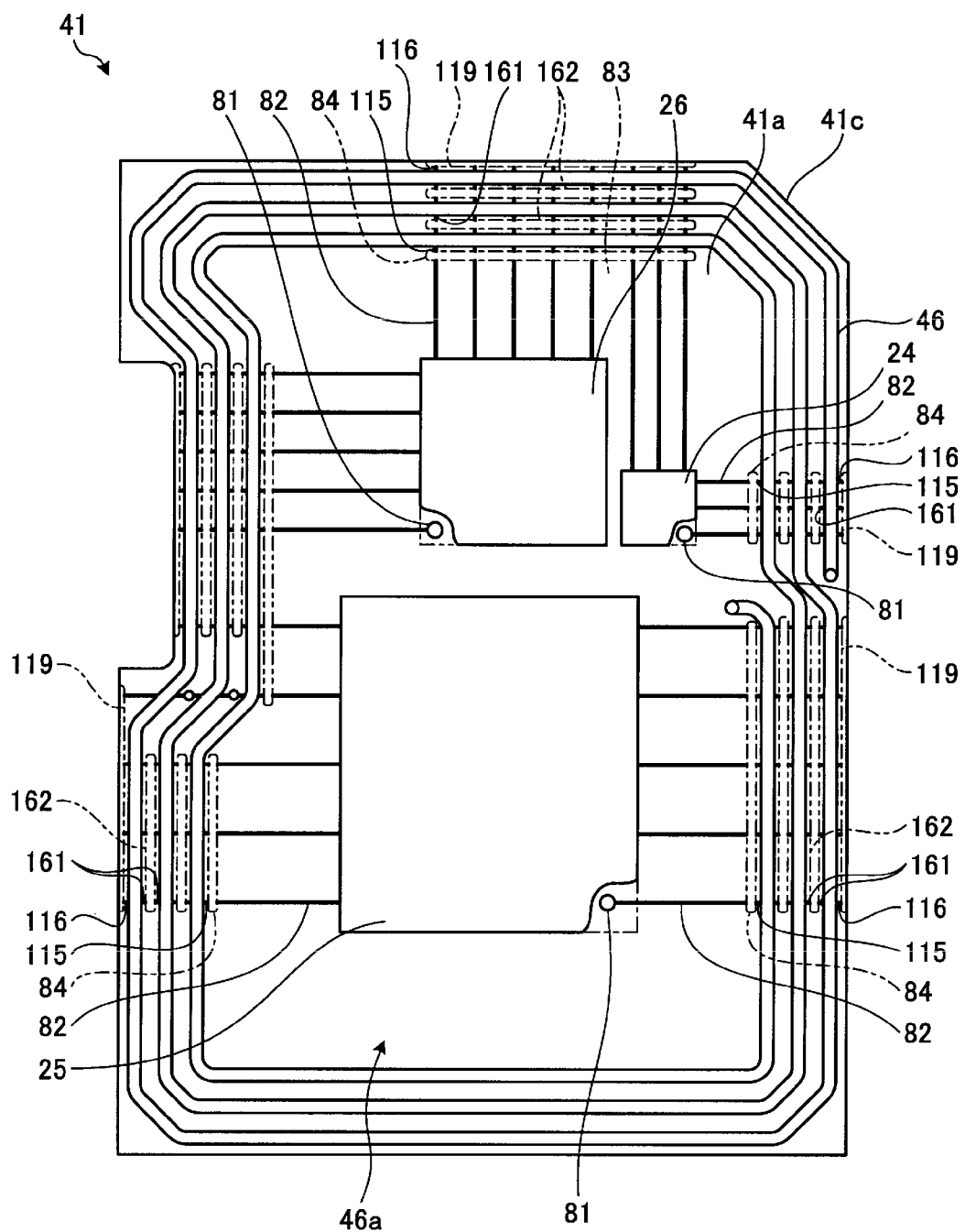
FIG. 17 is a plan view of a first substrate of an SD card according to a modification example of the fourth embodiment.
Figure 17:
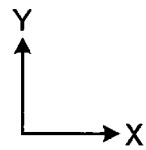

Hereinafter, a modification example of the fourth embodiment will be described with reference to FIG. 17 to FIG. 19. FIG. 17 is a plan view of the first substrate 41 according to the modification example of the fourth embodiment. As illustrated in FIG. 17, the plurality of connection pads 81, the plurality of first leads 82, the first solder resist 83, the plurality of second leads 115, a plurality of third leads 116, and a plurality of fourth leads 161 are formed on the first substrate 41 according to the modification example of the fourth embodiment. The plurality of first openings 84, a plurality of second openings 119, and a plurality of third openings 162 are formed in the first solder resist 83.

FIG. 17 illustrates the plurality of first leads 82, the plurality of second leads 115, the plurality of third leads 116, and the plurality of fourth leads 161 with solid lines and illustrates the plurality of first openings 84, the plurality of second openings 119, and the plurality of third openings 162 with double-dot chain lines for description.

Figure 18:
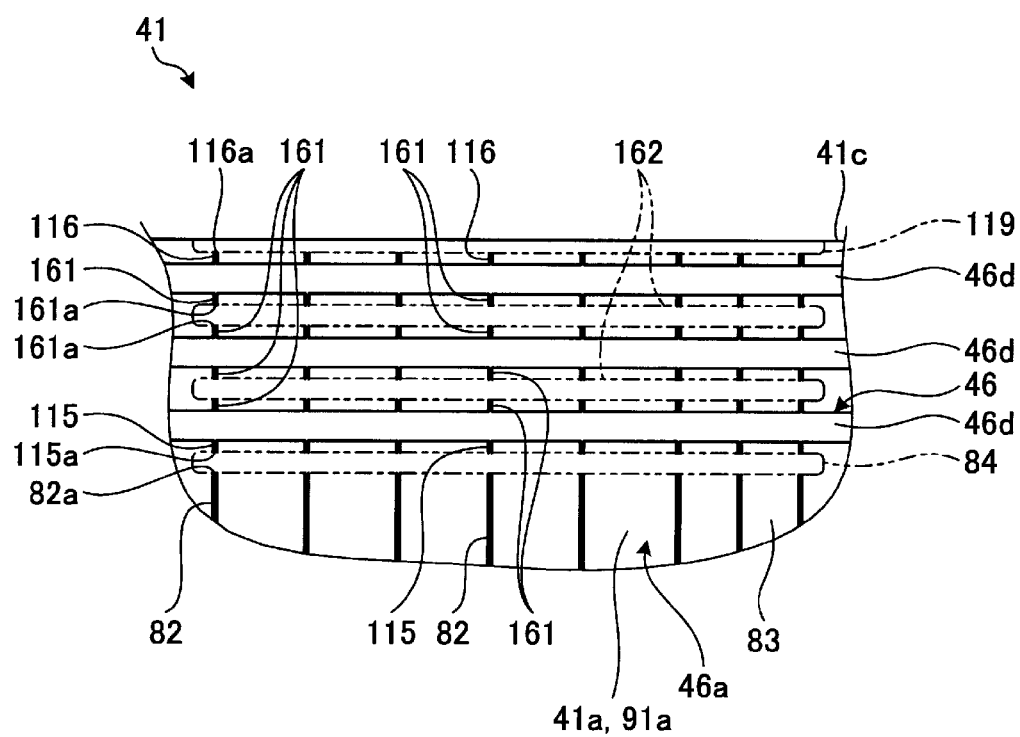
FIG. 18 is a plan view of a part of the first substrate according to the modification example of the fourth embodiment.

FIG. 18 is a plan view of a part of the first substrate according to the modification example of the fourth embodiment. The first antenna pattern 46 is wound a plurality of times in the modification example of the fourth embodiment. For that reason, as illustrated in FIG. 18, an extending portion 46d and another extending portion 46d of the first antenna pattern 46 extend substantially parallel to each other at an interval in a region that is adjacent to the end surface 41c of the first substrate 41. The extending portion 46d of the first antenna pattern 46 is a part of the first antenna pattern 46 that extends along the adjacent end surface 41c.

The fourth lead 161 is formed on the first surface 91a. Thus, the first solder resist 83 covers the fourth lead 161. The plurality of fourth leads 161 extends from the extending portion 46d of the first antenna pattern 46 to another adjacent extending portion 46d. For example, one fourth lead 161 extends from one extending portion 46d to another extending portion 46d that is adjacent to the one extending portion 46d and is separated farther from the flash memory 25 than the one extending portion 46d. That is, the fourth lead 161 is positioned between two adjacent extending portions 46d and 46d of the first antenna pattern 46.

Each of the plurality of fourth leads 161 includes a fourth end portion 161a. The fourth end portion 161a is the end portion of the fourth lead 161 that extends from the first antenna pattern 46. In other words, the fourth end portion 161a is positioned opposite to the first antenna pattern 46.

The fourth end portion 161a is separated from other conductors including other extending portions 46d of the first antenna pattern 46. Thus, the fourth lead 161 is electrically separated from other conductors that are different from the extending portion 46d of the first antenna pattern 46. In other words, the fourth lead 161 does not connect one extending portion 46d of the first antenna pattern 46 with another extending portion 46d in the midst of the first antenna pattern 46 that is wound a plurality of times.

The third opening 162 is a hole formed in the first solder resist 83. The third opening 162 is positioned between two adjacent extending portions 46d and 46d of the first antenna pattern 46 in a region that is adjacent to the end surface 41c of the first substrate 41. The third opening 162 is separated from two adjacent extending portions 46d and 46d of the first antenna pattern 46.

When the first surface 41a of the first substrate 41 is viewed as illustrated in FIG. 17, the fourth end portion 161a of the fourth lead 161 substantially overlies the edge of the first solder resist 83 that forms the third opening 162. The fourth end portion 161*a* may be arranged in other positions.

The fourth end portions 161*a* of the plurality of fourth leads 161 that extends from one extending portion 46*d* of the first antenna pattern 46 substantially overlie the edge of the first solder resist 83 that forms one third opening 162. Furthermore, the fourth end portions 161*a* of the plurality of fourth leads 161 that extends from another extending portion 46*d* of the first antenna pattern 46 substantially overlie the edge of the first solder resist 83 that forms one third opening 162.

The fourth end portion 161*a* of the fourth lead 161 that extends from one extending portion 46*d* of the first antenna pattern 46 faces the fourth end portion 161*a* of the fourth lead 161 that extends from another extending portion 46*d* of the first antenna pattern 46. The fourth lead 161 that extends from one extending portion 46*d* of the first antenna pattern 46 is positioned on the extension line of the fourth lead 161 that extends from another extending portion 46*d* of the first antenna pattern 46.

The first lead 82, the second lead 115, the third lead 116, and the plurality of fourth leads 161 that correspond to each other are positioned on the extension lines of each other. The arrangement of the first lead 82, the second lead 115, the third lead 116, and the fourth lead 161 is not limited thereto.

Figure 19:
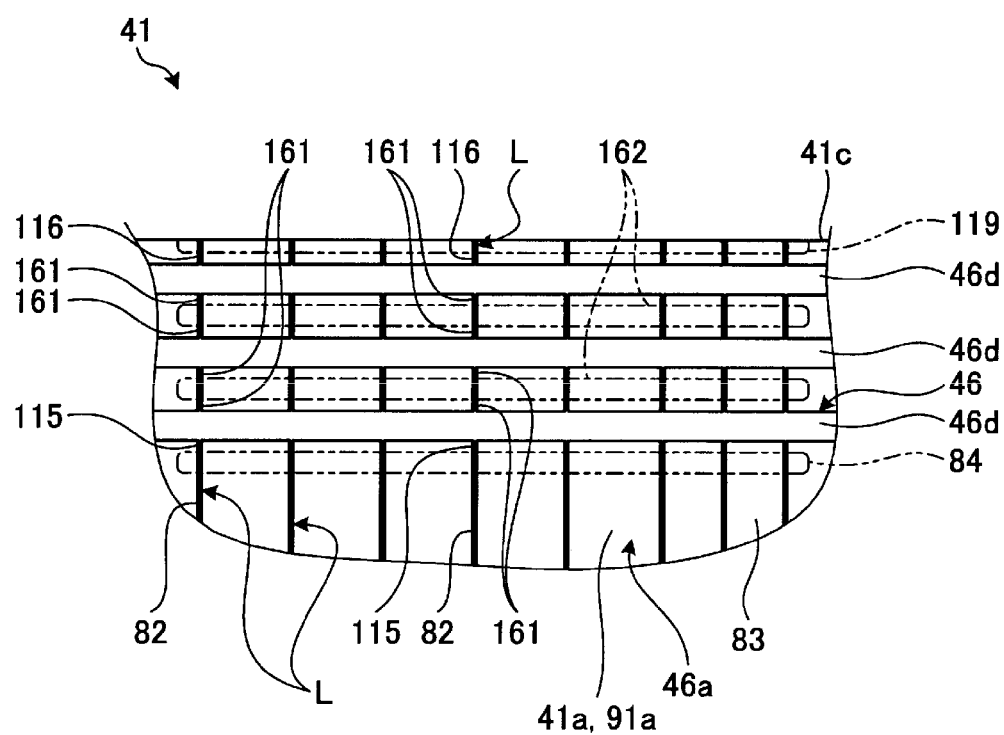
FIG. 19 is a plan view of a part of the first substrate during a process of manufacturing processes according to the modification example of the fourth embodiment.

FIG. 19 is a plan view of a part of the first substrate 41 during a process of manufacturing processes according to the modification example of the fourth embodiment. As illustrated in FIG. 19, a plurality of plated leads L is formed on the first surface 91*a* of the base substrate 91 before the plurality of connection pads 81 is formed in the first substrate 41. The plated lead L is provided in order to form the plurality of connection pads 81 and a plurality of other pads by, for example, electroplating.

Each of the plurality of plated leads L includes the first lead 82, the second lead 115, the third lead 116, and the plurality of fourth leads 161. The plated lead L extends from the connection pad 81 to the end surface 41*c* of the first substrate 41. In other words, the connection pad 81 is formed in the end portion of the plated lead L by electroplating.

Each of the plurality of plated leads L extends straight from one connection pad 81 to the end surface 41*c* of the first substrate 41. The plurality of plated leads L may be curved or may be joined (or branch).

The plurality of plated leads L intersects with a plurality of extending portions 46*d* of the first antenna pattern 46. In other words, the plurality of plated leads L electrically connects one extending portion 46*d* of the first antenna pattern 46 with another extending portion 46*d*. When, for example, the flash memory 25 or the memory controller 26 is wired using a wire bonding technology, a part of the first antenna pattern 46 may be formed of a bonding wire and be separated from the plated lead L.

The plurality of plated leads L, before the plurality of first substrates 41 is cut out of an aggregate substrate, is connected to the lead of the aggregate substrate that includes the plurality of first substrates 41. That is, the plurality of plated leads L connects the lead of the aggregate substrate with the inside 46*a* of the first antenna pattern 46. When the connection pad 81 is formed by electroplating, the plated lead L is connected to a power source.

When the plurality of connection pads 81 is formed, a part of the plated lead L is removed by, for example, etchback. The plated lead L is etched back through the first opening 84, the second opening 119, and the plurality of third openings 162 and is thereby split into the first lead 82, the second lead 115, the third lead 116, and the plurality of fourth leads 161.

By etching back the plated lead L, the plurality of connection pads 81 is electrically separated from the first antenna pattern 46. Furthermore, one extending portion 46*d* of the first antenna pattern 46 is electrically separated from another extending portion 46*d*.

The first lead 82 extends from the connection pad 81 and the second lead 115 extends from the first antenna pattern 46 in the SD card 11 according to the modification example of the fourth embodiment. Furthermore, the third lead 116 extends from the first antenna pattern 46 to the end surface 41*c* of the first substrate 41, and the fourth lead 161 extends from one extending portion 46*d* of the first antenna pattern 46 to another extending portion 46*d*. The first to fourth leads 82, 115, 116, and 161 are electrically separated from other conductors. The first to fourth leads 82, 115, 116, and 161, for example, are connected during the manufacturing processes of the SD card 11 and form the plated lead L. In this case, by applying a voltage to the plated lead L that intersects with the first antenna pattern 46, the connection pad 81 is formed in the end portion of the first lead 82 by electroplating. The first to fourth leads 82, 115, 116, and 161 are split after the connection pad 81 is formed. The connection pad 81 can be formed by electroplating using the first to fourth leads 82, 115, 116, and 161 in the first substrate 41 in which the first antenna pattern 46 is formed.

A voltage is applied to the plurality of plated leads L, each of which extends in a straight linear shape, during the above process of forming the connection pad 81. For that reason, the distance from a power supply to the end portion of the first lead 82 of each plated lead L is likely to become uniform. In addition, the distance from the end surface 41*c* of the first substrate 41 to the end portion of the first lead 82 of each plated lead L is likely to become uniform. As a result, power supply can be stabilized, and the plurality of connection pads 81 is likely to be uniformly formed by electroplating.

Fifth Embodiment

Figure 20:
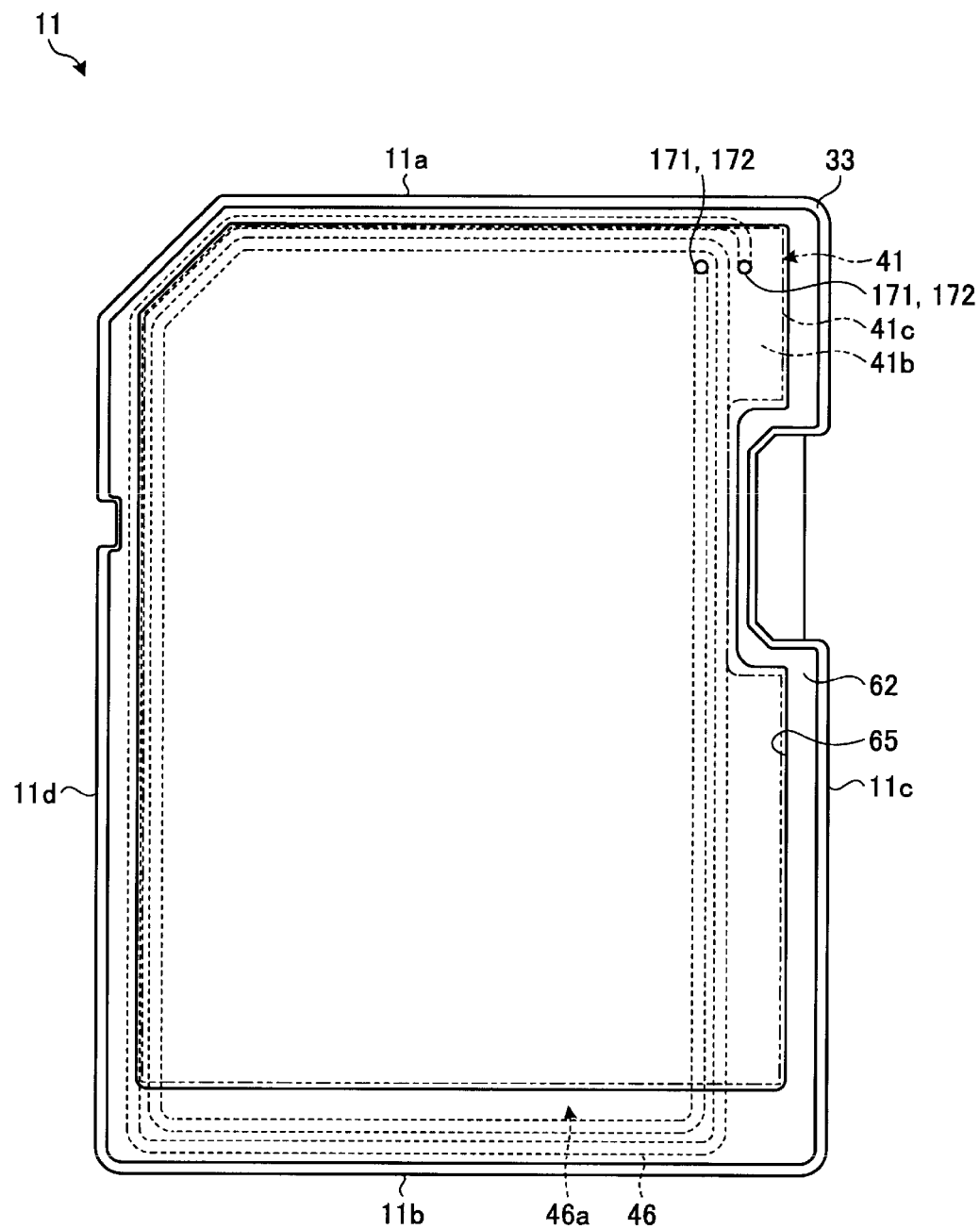
FIG. 20 is a bottom view of an SD card according to a fifth embodiment, from which a bottom cover is removed.

Hereinafter, a fifth embodiment will be described with reference to FIG. 20. FIG. 20 is a bottom plan view of the SD card 11 according to the fifth embodiment without the bottom cover 32. The first substrate 41 is illustrated by a double-dot chain line in FIG. 20.

As illustrated in FIG. 20, the first antenna pattern 46 is mounted in the top cover 33 in the fifth embodiment. The wireless antenna 23 in FIG. 2 includes the first antenna pattern 46 in the fifth embodiment.

The first antenna pattern 46 is embedded in the top cover 33 in the fifth embodiment. In other words, the first antenna pattern 46 is positioned between the upper surface 61 and the second inner surface 62 of the top cover 33. The first antenna pattern 46, for example, may be provided on the second inner surface 62 of the top cover 33 or may be provided in the bottom cover 32. The first antenna pattern 46 may be a conductive pattern formed using various methods such as printing or may be a conductor such as a copper line.

A first terminal 171 is provided in both end portions of the first antenna pattern 46. The first terminal 171, for example, protrudes from the third recess portion 65 on the second inner surface 62 of the top cover 33. The first terminal 171 overlies the first substrate 41 when the second surface 41*b* of the first substrate 41 is viewed as illustrated in FIG. 20.

Two second terminals 172 are provided on the first surface 41*a* of the first substrate 41. The second terminal 172 faces the first terminal 171. The second terminal 172, for example, is electrically connected to the first terminal 171 through a conductive spring. The second terminal 172 may be in direct contact with the first terminal 171 or may be connected thereto by solder. As a result, the circuit C of the first substrate 41 and the first antenna pattern 46 are electrically connected.

The first antenna pattern 46 is formed in the top cover 33 of the casing 31 in the SD card 11 according to the fifth embodiment. For that reason, flexibility of location of wiring in the first substrate 41 can be improved. Furthermore, by providing the first antenna pattern 46 in the casing 31 of the SD card 11, the number of components of the SD card 11 and the manufacturing cost of the SD card 11 can be suppressed.

The first terminal 171 of the first antenna pattern 46 is electrically connected with the second terminal 172 of the first substrate 41 by, for example, a spring. As a result, even if the first antenna pattern 46 and the first substrate 41 are relatively moved, a connected portion between the first antenna pattern 46 and the first substrate 41 is prevented from being damaged.

Sixth Embodiment

Figure 21:
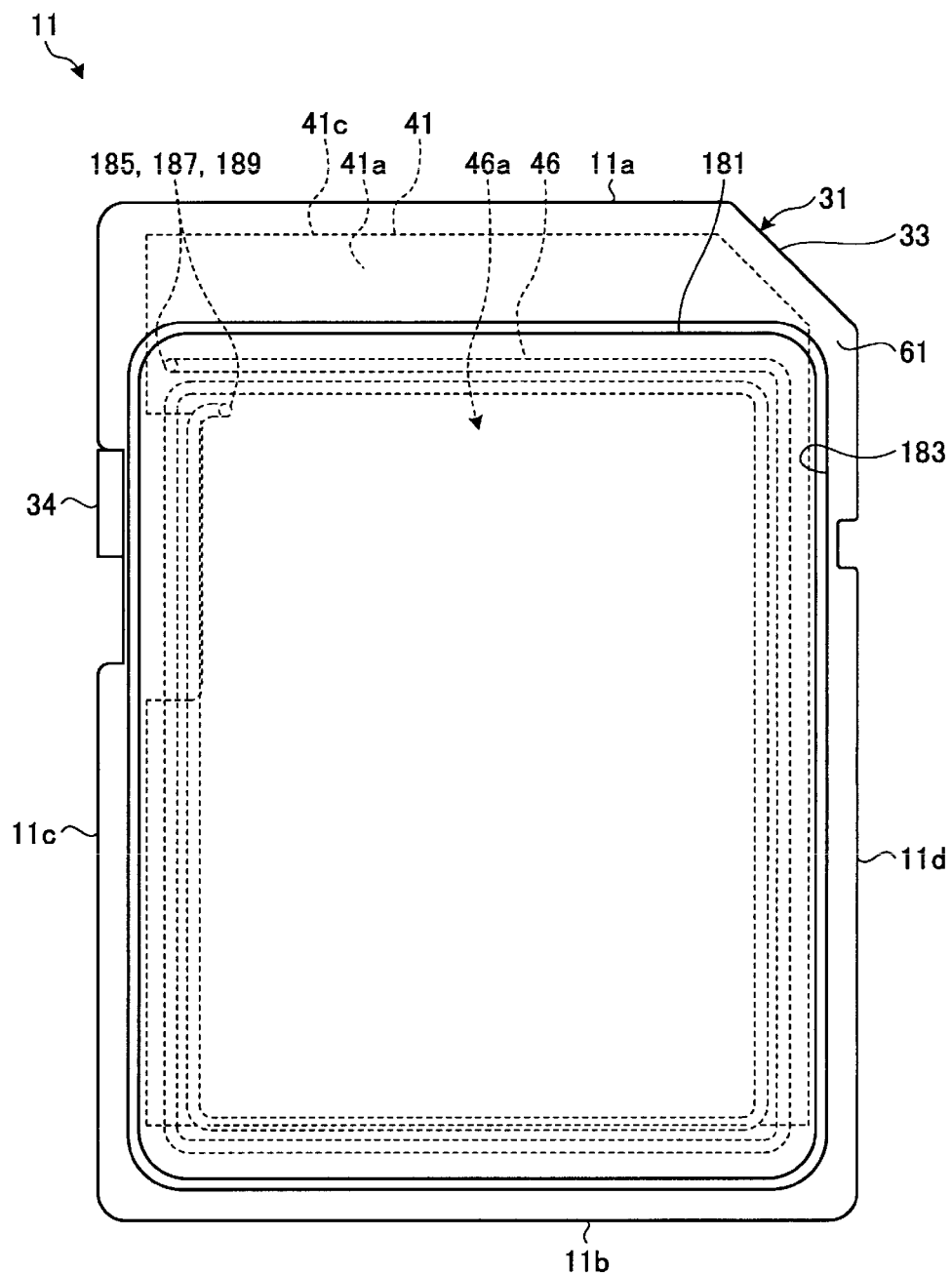
FIG. 21 is a plan view of an SD card according to a sixth embodiment.
Figure 21:
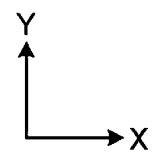

Hereinafter, a sixth embodiment will be described with reference to FIG. 21. FIG. 21 is a plan view of the SD card 11 according to the sixth embodiment. As illustrated in FIG. 21, a label 181 is bonded to the upper surface 61 of the top cover 33.

The label 181 is a sheet bonded to the casing 31. For example, the specifications, the storage capacity, the direction of insertion, and the description of the SD card 11 are represented on the label 181. The label 181 is not limited thereto. The label 181, for example, is bonded to a recess 183 that is formed on the upper surface 61. Apart of the label 181 may be located outside of the recess 183.

The first antenna pattern 46 is mounted in the label 181 in the sixth embodiment. The wireless antenna 23 in FIG. 2 includes the first antenna pattern 46 in the sixth embodiment.

The first antenna pattern 46 is embedded in the label 181 in the sixth embodiment. The first antenna pattern 46, for example, may be provided on an adhesive surface of the label 181 bonded to the top cover 33. The adhesive surface is a surface of the label 181 on which an adhesive is applied. The first antenna pattern 46 may be a conductive pattern formed using various methods such as printing or may be a conductor such as a copper line.

A third terminal 185 is provided in both end portions of the first antenna pattern 46. The third terminal 185, for example, is provided on the adhesive surface of the label 181. The third terminal 185 overlies the first substrate 41 when the upper surface 61 of the top cover 33 is viewed in a plan view as in FIG. 21.

Two through electrodes 187 are provided in the top cover 33. The through electrode 187 is formed of a conductor and passes through the top cover 33. The through electrode 187 protrudes from the upper surface 61 and from the second inner surface 62. The third terminal 185 of the first antenna pattern 46 faces the through electrode 187. The third terminal 185 is in contact with the through electrode 187 and is electrically connected to the through electrode 187.

By bonding the label 181 to the recess 183 of the top cover 33, the third terminal 185 is in contact with the through electrode 187. That is, the recess 183 is used for aligning the positions of the third terminal 185 and the through electrode 187.

Two fourth terminals 189 are provided on the first surface 41a of the first substrate 41. The fourth terminal 189 faces the through electrode 187. The fourth terminal 189, for example, is electrically connected to the through electrode 187 through a conductive spring. The fourth terminal 189 may be in indirect contact with the through electrode 187 or connected thereto by solder.

The through electrode 187 is disposed between the third terminal 185 of the first antenna pattern 46 and the fourth terminal 189 of the first substrate 41. As a result, the third terminal 185 is electrically connected to the fourth terminal 189 through the through electrode 187, and the circuit C of the first substrate 41 is electrically connected with the first antenna pattern 46.

The first antenna pattern 46 is provided in the label 181 of the SD card 11 according to the sixth embodiment. As a result, flexibility of location of wiring in the first substrate 41 can be improved. Furthermore, by providing the first antenna pattern 46 in the label 181 of the SD card 11, the number of components of the SD card 11 and the manufacturing cost of the SD card 11 can be suppressed.

The adhesive surface of the label 181 adheres to the upper surface 61 of the top cover 33 from which the through electrode 187 protrudes. As a result, the label 181 in which the first antenna pattern 46 is mounted and the through electrode 187 are prevented from relatively moving, and a connected portion between the first antenna pattern 46 and the first substrate 41 is prevented from being damaged.

The position to which the label 181 is bonded is not limited to the upper surface 61 of the top cover 33 and may be other parts of the casing 31. For example, the label 181 may be bonded to the second inner surface 62 of the top cover 33. In this case, the third terminal 185 and the fourth terminal 189 are electrically connected not through the through electrode 187.

Furthermore, the position in which the first antenna pattern 46 is mounted is not limited to the label 181 and may be a sheet that does not include an adhesive surface. In this case, for example, the sheet is disposed between the top cover 33 and the label 181 that does not include the first antenna pattern 46. Accordingly, the sheet that does not include an adhesive surface can be bonded to the casing 31.

According to at least one embodiment described above, at least a part of the first antenna is positioned outside of the first substrate, and at least a part of the remaining part is positioned in the first substrate. As a result, the manufacturing cost of a semiconductor memory device can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:
1. A memory card, comprising:
  a substrate;
  a nonvolatile memory on the substrate;
  a memory controller on the substrate and configured to control access to the nonvolatile memory;
  an interface terminal for external wired connection, on the substrate;

an antenna, a region surrounded by the antenna including a first region that overlaps with the substrate and a second region that does not overlap with the substrate; and a communication controller on the substrate, electrically connected to the antenna, and configured to wirelessly communicate with an external device through the antenna, using power generated at the antenna by an electromagnetic induction caused by the external device.

2. The memory card according to claim 1, further comprising:
a second substrate on which the antenna is formed.

3. The memory card according to claim 2, wherein
the substrate includes a first pad that is electrically connected to the communication controller and a second pad that is electrically separated from the nonvolatile memory, the memory controller, the interface terminal, and the communication controller, and
the second substrate includes a third pad that is soldered with the first pad and a fourth pad that is soldered with the second pad, the communication controller and the antenna being electrically connected through an electrical connection of the first pad and the third pad.

4. The memory card according to claim 3, wherein
one of the third and fourth pads is located on the second substrate within the region, and the other of the third and fourth pads is located outside the region.

5. The memory card according to claim 2, wherein
a thickness of the second substrate is less than a thickness of the substrate.

6. The memory card according to claim 1, wherein
at least one of the nonvolatile memory, the memory controller, and the communication controller is located outside the region.

7. The memory card according to claim 1, wherein
the substrate includes an antenna portion that is electrically connected to the antenna and serves as a single antenna together with the antenna.

8. The memory card according to claim 7, wherein
the antenna portion is disposed along a periphery of the substrate.

9. The memory card according to claim 7, wherein
the antenna portion includes a first sub-portion formed on a first surface of the substrate and a second sub-portion formed on a second surface of the substrate opposite to the first surface.

10. The memory card according to claim 9, wherein
the interface terminal is formed on the second surface of the substrate, and the first sub-portion of the antenna portion overlaps with the interface terminal.

11. The memory card according to claim 1, wherein
the substrate includes a ground terminal in a region on which the nonvolatile memory or the memory controller is disposed.

12. The memory card according to claim 1, further comprising:
a sealing resin layer formed on the substrate and covering the nonvolatile memory, the memory controller, and the communication controller.

13. The memory card according to claim 1, further comprising:
a housing including a first member and a second member, the substrate and the antenna being disposed in a space formed by the first and second members.

14. The memory card according to claim 13, wherein
the first member includes a first recessed portion in which the antenna is disposed, and
the second member includes a second recessed portion in which at least part of the substrate is disposed.

15. The memory card according to claim 13, wherein
the antenna is embedded in one of the first and second members.

16. The memory card according to claim 13, further comprising:
a label fixed to one of the first and second members, the antenna being embedded in the label.

17. A memory card, comprising:
a substrate;
a nonvolatile memory on the substrate;
a memory controller on the substrate and configured to control access to the nonvolatile memory;
an interface terminal for external wired connection on the substrate;
an antenna; and
a communication controller disposed on the substrate, electrically connected to the antenna, and configured to wirelessly communicate with an external device through the antenna, using power generated at the antenna by an electromagnetic induction caused by the external device, wherein
a region surrounded by the antenna, that includes a first region that overlaps with at least one of the nonvolatile memory and the communication controller, and a second region that does not overlap with the substrate.

18. The memory card according to claim 17, further comprising:
a second substrate on which the antenna is formed.

19. The memory card according to claim 18, wherein
a thickness of the second substrate is less than a thickness of the substrate.

20. The memory card according to claim 17, wherein
at least one of the nonvolatile memory, the memory controller, and the communication controller is located outside the region.

* * * * *